US012625487B2

(12) United States Patent
Aidan

(10) Patent No.: US 12,625,487 B2
(45) Date of Patent: May 12, 2026

(54) ROBOTIC COSMETIC APPLICATION DEVICE WITH MACHINE LEARNING AND USER PREFERENCE INTEGRATION

(71) Applicant: ELC MANAGEMENT LLC, Melville, NY (US)

(72) Inventor: Christopher Aidan, Austin, TX (US)

(73) Assignee: ELC MANAGEMENT LLC, Melville, NY (US)

( * ) Notice: Subject to any disclaimer, the term of this patent is extended or adjusted under 35 U.S.C. 154(b) by 134 days.

(21) Appl. No.: 18/443,724

(22) Filed: Feb. 16, 2024

(65) Prior Publication Data

US 2025/0264863 A1    Aug. 21, 2025

(51) Int. Cl.
G05B 19/4155       (2006.01)
B25J 9/16           (2006.01)

(52) U.S. Cl.
CPC .......... G05B 19/4155 (2013.01); B25J 9/163 (2013.01); G05B 2219/40269 (2013.01)

(58) Field of Classification Search
None
See application file for complete search history.

(56) References Cited

U.S. PATENT DOCUMENTS 5,903,465 A * 5/1999 Brown .................... G07F 17/18
700/242
11,676,157 B2 * 6/2023 Harvill ................. G06V 40/161
705/26.5

2012/0067364 A1 * 3/2012 Wong .................... A45D 44/005
132/200
2012/0158184 A1 * 6/2012 Ma .......................... B25J 9/1679
901/43
2013/0216295 A1 * 8/2013 Wong .................... A45D 44/00
401/195
2014/0174463 A1 * 6/2014 Wong .................... A45D 44/005
132/200
2017/0069052 A1 * 3/2017 Li ......................... B25J 13/089
2017/0348982 A1 * 12/2017 Wong .................... G06V 40/171
2020/0285835 A1 * 9/2020 Whitelaw ............ A45D 44/005
2022/0284827 A1 * 9/2022 Garcia ............... G09B 19/0076
2025/0214250 A1 * 7/2025 Shalah-Abboud ..... B25J 9/1697

* cited by examiner

*Primary Examiner* — Ryan Rink
(74) *Attorney, Agent, or Firm* — MARSHALL, GERSTEIN & BORUN LLP

(57) ABSTRACT

A robotic cosmetic application device, and techniques for controlling the device, are provided. The device may include sensors that capture real-time data associated with a user's face and robotic arms equipped with makeup applicator tools. The device may receive an indication of a makeup look selected by the user; analyze the real-time data associated with the user's face in order to generate a three-dimensional map associated with the face of the user, identify facial features of the user's face on the three-dimensional map; and control the robotic arms to automatically adjust the makeup applicator tools with respect to the user's face, to apply one or more cosmetic products to the user's facial features in order to achieve the makeup look selected by the user.

19 Claims, 11 Drawing Sheets

Robotic Cosmetic Application
Device Application

Select A Look    ▽

Smoky Eye    △
Cat Eye
Contour
Day Look
Night Look
Party Look
Work Look
Celebrity Look
Custom Look
▽

Robotic Cosmetic Application
Device Application

Select A Look    ▽

Smoky Eye    △
Cat Eye
Contour
Day Look
Night Look
Party Look
Work Look
Celebrity Look
Custom Look
▽

400

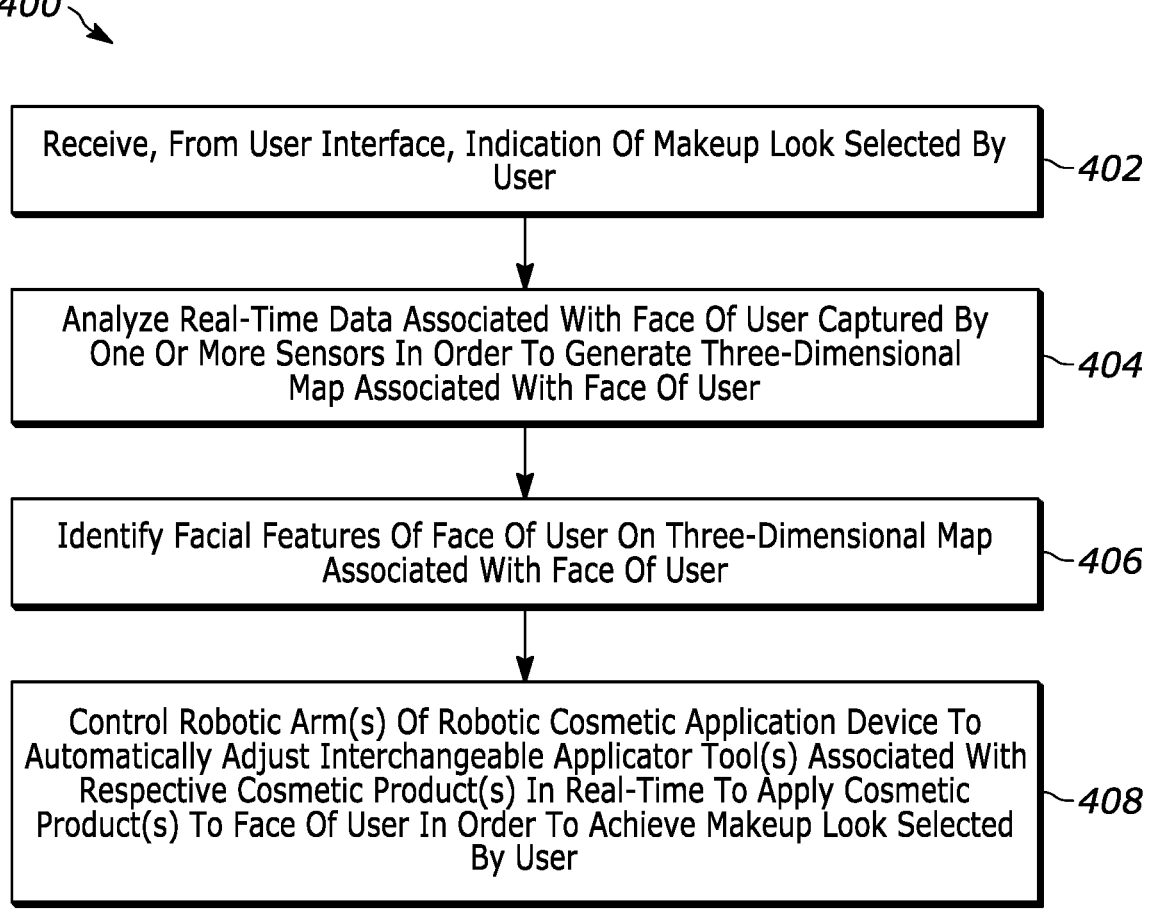

Receive, From User Interface, Indication Of Makeup Look Selected By User ~402

Analyze Real-Time Data Associated With Face Of User Captured By One Or More Sensors In Order To Generate Three-Dimensional Map Associated With Face Of User ~404

Identify Facial Features Of Face Of User On Three-Dimensional Map Associated With Face Of User ~406

Control Robotic Arm(s) Of Robotic Cosmetic Application Device To Automatically Adjust Interchangeable Applicator Tool(s) Associated With Respective Cosmetic Product(s) In Real-Time To Apply Cosmetic Product(s) To Face Of User In Order To Achieve Makeup Look Selected By User ~408

FIG. 4

ROBOTIC COSMETIC APPLICATION DEVICE WITH MACHINE LEARNING AND USER PREFERENCE INTEGRATION

FIELD OF THE INVENTION

The present invention relates generally to the field of cosmetics and, more specifically, to a robotic cosmetic application device capable of precise and controlled movements for applying makeup, utilizing machine learning, artificial intelligence, augmented reality, and other technologies.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

While there are devices that allow for the application of makeup, these makeup applicators are typically manually operated and do not provide precision, customization, and versatility beyond the user's baseline makeup knowledge and skills. Moreover, these makeup applicators may be difficult to use for users with certain disabilities.

SUMMARY

In one aspect, a robotic cosmetic application device is provided, comprising: one or more sensors configured to capture real-time data associated with a face of a user; one or more robotic arms equipped with one or more respective makeup applicator tools; a controller, comprising: one or more processors; and one or more memories storing non-transitory computer-readable instructions that, when executed by the one or more processors, cause the one or more processors to: receive, from a user interface associated with the intelligent robotic cosmetic application device, an indication of a makeup look selected by the user; analyze the real-time data associated with the face of the user in order to generate a three-dimensional map associated with the face of the user; identify one or more facial features of the face of the user on the three-dimensional map associated with the face of the user; and control the one or more robotic arms to automatically adjust the one or more respective makeup applicator tools with respect to the face of the user, to apply one or more cosmetic products to the facial features of the user in order to achieve the makeup look selected by the user. The robotic cosmetic application device may include additional, fewer, or alternate elements, including those discussed elsewhere herein.

In another aspect, a computer-implemented method for controlling a robotic cosmetic application device via one or more processors is provided. The method may include receiving, from a user interface associated with the intelligent robotic cosmetic application device, an indication of a makeup look selected by the user; analyzing real-time data associated with the face of the user captured by one or more sensors in order to generate a three-dimensional map associated with the face of the user; identifying one or more facial features of the face of the user on the three-dimensional map associated with the face of the user; and controlling one or more robotic arms of the intelligent robotic cosmetic application device, equipped with one or more respective makeup applicator tools, to automatically adjust the one or more respective makeup applicator tools with respect to the face of the user, to apply one or more cosmetic products to the facial features of the user in order to achieve the makeup look selected by the user. The method may include additional, fewer, or alternate actions, including those discussed elsewhere herein.

In still another aspect, a non-transitory computer-readable storage medium storing instructions for controlling a robotic cosmetic application device is provided. The computer-readable instructions, when executed by one or more processors, may cause the one or more processors to perform a method. The method may include receiving, from a user interface associated with the intelligent robotic cosmetic application device, an indication of a makeup look selected by the user; analyzing real-time data associated with the face of the user captured by one or more sensors in order to generate a three-dimensional map associated with the face of the user; identifying one or more facial features of the face of the user on the three-dimensional map associated with the face of the user; and controlling one or more robotic arms of the intelligent robotic cosmetic application device, equipped with one or more respective makeup applicator tools, to automatically adjust the one or more respective makeup applicator tools with respect to the face of the user, to apply one or more cosmetic products to the facial features of the user in order to achieve the makeup look selected by the user. The instructions may direct additional, fewer, or alternative functionality, including that discussed elsewhere herein.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof.

There are shown in the drawings arrangements which are presently discussed, it being understood, however, that the present embodiments are not limited to the precise arrangements and instrumentalities shown, wherein:

FIG. 4 depicts a flow diagram of an exemplary computer-implemented method for controlling a robotic cosmetic application device, according to some embodiments.

Figure 1A:
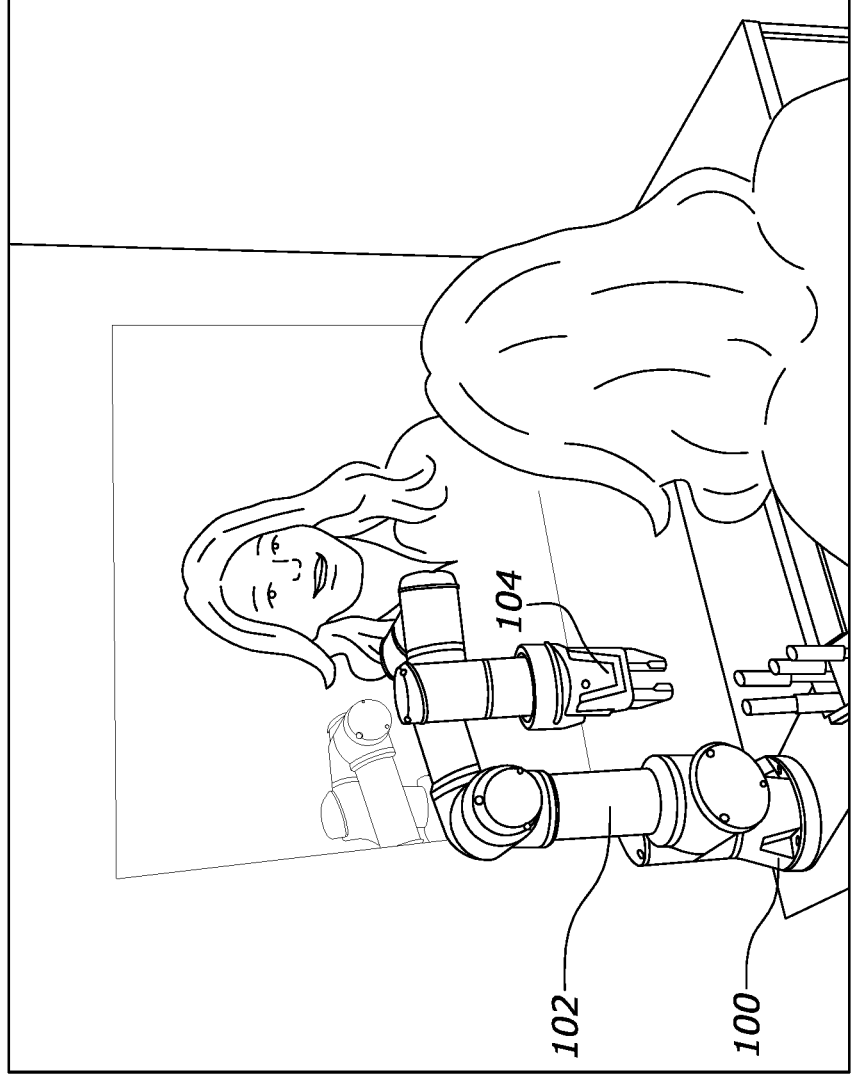
FIG. 1A-1G depict actions of an exemplary robotic cosmetic application device as the robotic cosmetic application device applies a cosmetic product to an individual, according to some embodiments.

While the systems and methods disclosed herein are susceptible of being embodied in many different forms, it is shown in the drawings and will be described herein in detail specific exemplary embodiments thereof, with the understanding that the present disclosure is to be considered as an exemplification of the principles of the systems and methods disclosed herein and is not intended to limit the systems and methods disclosed herein to the specific embodiments illustrated. In this respect, before explaining at least one embodiment consistent with the present systems and methods disclosed herein in detail, it is to be understood that the systems and methods disclosed herein is not limited in its application to the details of construction and to the arrangements of components set forth above and below, illustrated in the drawings, or as described in the examples.

Methods and apparatuses consistent with the systems and methods disclosed herein are capable of other embodiments and of being practiced and carried out in various ways. Also, it is to be understood that the phraseology and terminology employed herein, as well as the abstract included below, are for the purposes of description and should not be regarded as limiting.

DETAILED DESCRIPTION

Overview

The present disclosure provides a robotic cosmetic application device (also referred to as an "intelligent robotic cosmetic application device" or a "smart robotic cosmetic application device" herein) that utilizes smart technologies to deliver a personalized and precise makeup application experience. The robotic cosmetic application device uses an auto-adjusting system, machine learning (ML), artificial intelligence (AI), augmented reality (AR), and other technologies to accurately apply makeup according to the user's preferences, including re-creating looks selected by the user. The robotic cosmetic application device also offers integration with smart devices and smart packaging, which allows the robotic cosmetic application device to create a wide variety of makeup looks and styles. As provided herein, the smart auto-adjusting makeup applicator device streamlines the cosmetic application process, providing users with a personalized, efficient, and precise makeup experience.

The robotic cosmetic application device provided herein embodies a unique blend of technology and usability to enhance the user's makeup application experience. Advantageously, the robotic cosmetic application device provided herein incorporates features such as auto-adjustment based on facial contours, hyper-personalization considering factors like skin type and weather conditions, compatibility with smart devices and smart packaging, and the ability to save, recreate, and subscribe to different looks, in various embodiments. The integration of AR for detailed facial mapping and makeup preview further distinguishes this device, providing users an immersive and interactive makeup experience. Beneficially, the robotic cosmetic application device may continue to learn and adapt based on user preferences, software updates, and updated makeup looks to capture the latest trends.

The robotic cosmetic application device utilizes sensors to detect the contours and features of the user's face, auto-adjusting the arms' and/or the applicators' angle, pressure, and movement to ensure a precise and controlled application. The robotic cosmetic application device uses machine learning algorithms and artificial intelligence to learn the user's facial features, skin type, and personal preferences over time. It adjusts its operation accordingly to improve the makeup application process, ensuring optimal results each time. Using AR technology, the robotic cosmetic application device creates a detailed 3D map of the user's face. The robotic cosmetic application device uses this map to accurately apply makeup to the desired areas. The AR interface also allows the user to preview different looks before application. The robotic cosmetic application device can be paired with smartphones, tablets, or computers. The user can then select or design makeup looks on the paired device, which the applicator device will then replicate. The robotic cosmetic application device is compatible with smart packaging, which contains information about the makeup (such as color, texture, and type). When the robotic cosmetic application device comes into the vicinity with the smart packaging, it reads this information and adjusts its application method accordingly. The robotic cosmetic application device can save looks the user has created or applied in the past. The user can also subscribe to looks created by others, allowing the user to experiment with and apply a wide variety of makeup styles. The robotic cosmetic application device takes into account factors such as the user's skin type, preferred style, and even the current weather conditions to adjust its application method, ensuring a personalized makeup experience.

The robotic cosmetic application device provides users with a personalized, efficient, and precise makeup experience, eliminating the need for manual application and reducing the likelihood of uneven or inaccurate cosmetic application. The robotic cosmetic application device has the potential to revolutionize the makeup application process by providing users with a personalized, efficient, and precise makeup experience. The robotic cosmetic application device's innovative use of AI, ML, and computer vision technologies enables it to adapt to each user's unique facial features and preferences, ensuring flawless cosmetic application and reducing the likelihood of uneven or inaccurate makeup application. With the addition of the features mentioned above, the robotic cosmetic application device can provide even greater convenience and functionality for users, making it a valuable addition to any makeup routine.

By incorporating these advanced features and enhancements, the robotic cosmetic application device can further revolutionize the makeup application process and expand its applications. The robotic cosmetic application device can become an indispensable tool for users looking for a personalized, efficient, and precise makeup experience, making it an attractive option for both personal and professional use.

Overall, the robotic cosmetic application device represents a significant advancement in the field of cosmetic application devices. By leveraging AI, ML, and computer vision technologies, the robotic cosmetic application device provides users with a personalized, efficient, and precise makeup experience that adapts to each user's unique facial features and preferences. The robotic cosmetic application device streamlines the makeup application process, ensuring flawless results with minimal effort. The integration of additional features such as VR and AR technologies, environment and lighting adaptation, subscription-based makeup refills, adaptive makeup tutorials, biometric authentication, multi-user support, and skin health monitoring further enhances the user experience and expands the robotic cosmetic application device's applications. The robotic cosmetic application device has the potential to revolutionize the makeup application process for users across different skill levels, from beginners to professional makeup artists. By making it easier to achieve perfect cosmetic application, the robotic cosmetic application device can not only save users time and effort but also boost their confidence and self-esteem. As the robotic cosmetic application device continues to evolve and incorporate advanced features, it has the potential to become an indispensable tool in the world of cosmetics, revolutionizing the way people apply makeup and care for their skin.

Example Robotic Cosmetic Application Device

FIG. 1A-1G depict actions of an exemplary robotic cosmetic application device 100 as the robotic cosmetic application device 100 applies a cosmetic product to an individual, according to some embodiments. As shown in FIG. 1A, the robotic cosmetic application device 100 includes a housing 102 and one or more arms 104. The one or more arms 104 may be attached to the housing and may each be configured to move with one or more degrees of freedom. As discussed in greater detail below with respect to FIG. 2, the robotic cosmetic application device 100 may include sensors configured to capture data associated with a user's face, as well as motors and/or actuators that may be automatically controlled to move and/or adjust the arms 104 and/or applicator tools 106 in real-time to select various cosmetic products and apply them to the user's face. For instance, the motors and/or actuators may be automatically controlled to move and/or adjust the arms 104 and/or applicator tools 106 in real-time as the robotic cosmetic application device 100 applies a cosmetic product to the user's face, e.g., in order to adjust an angle, a pressure, a movement, a spin, etc., of the arms 104 and/or applicator tools 106, in order to apply a cosmetic product to the face of the user. For example, the motors and/or actuators may be automatically controlled to move and/or adjust the arms 104 and/or applicator tools 106 laterally, vertically, and/or at various angles and pressures, and may be adjusted to spin at various speeds, as the robotic cosmetic application device 100 moves the arms 104 and/or applicator tools 106 to the user's face, in order to apply a cosmetic product to the face of the user.

Figure 1B:
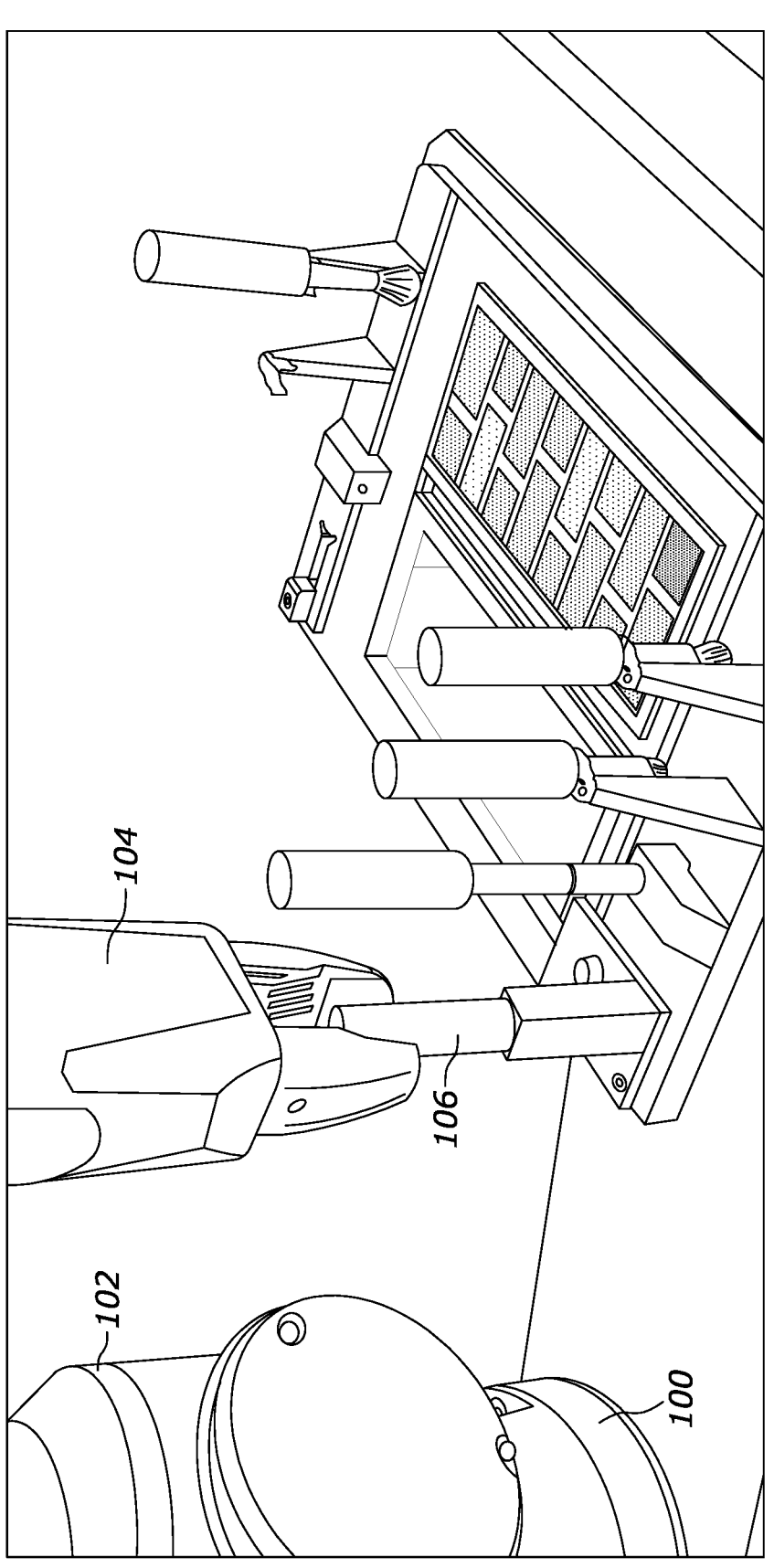
Figure 1C:
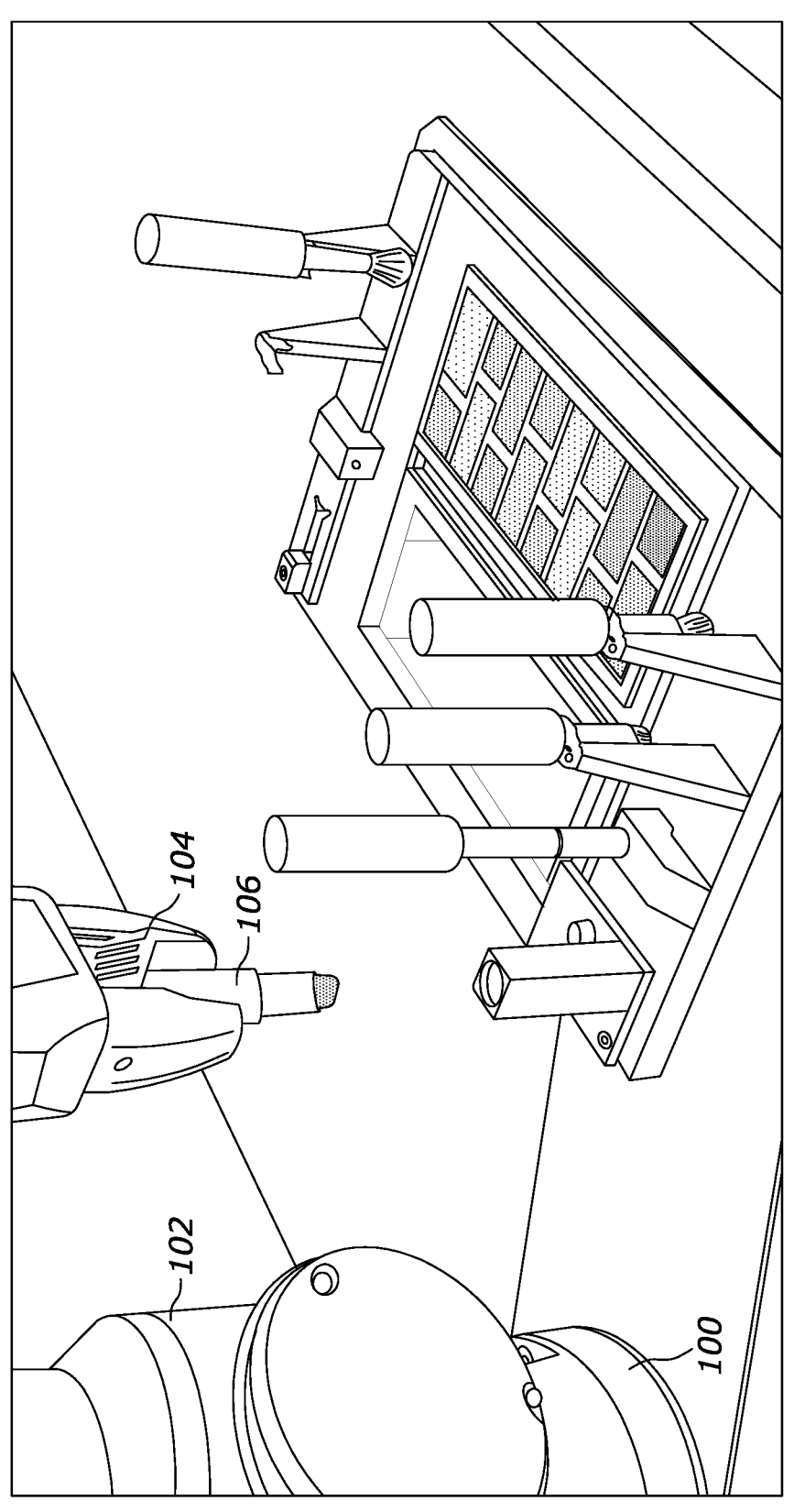

For instance, as shown in FIG. 1B and 1C, the robotic cosmetic application device 100 may utilize an arm 104 to pick up, grab, or otherwise attach an applicator tool 106 (in this case, a lip product applicator tool). In other examples, the robotic cosmetic application device 100 may include one or more applicator tools 106 permanently or interchangeably attached to one or more arms 104. That is, for example, the housing 102 may be configured such that one or more applicator tools 106 may be attached to the housing 102, and may be subsequently removed from the housing 102 by a user (or by the robotic cosmetic application device 100) and replaced with another of the one or more applicator tools 106.

Figure 1D:
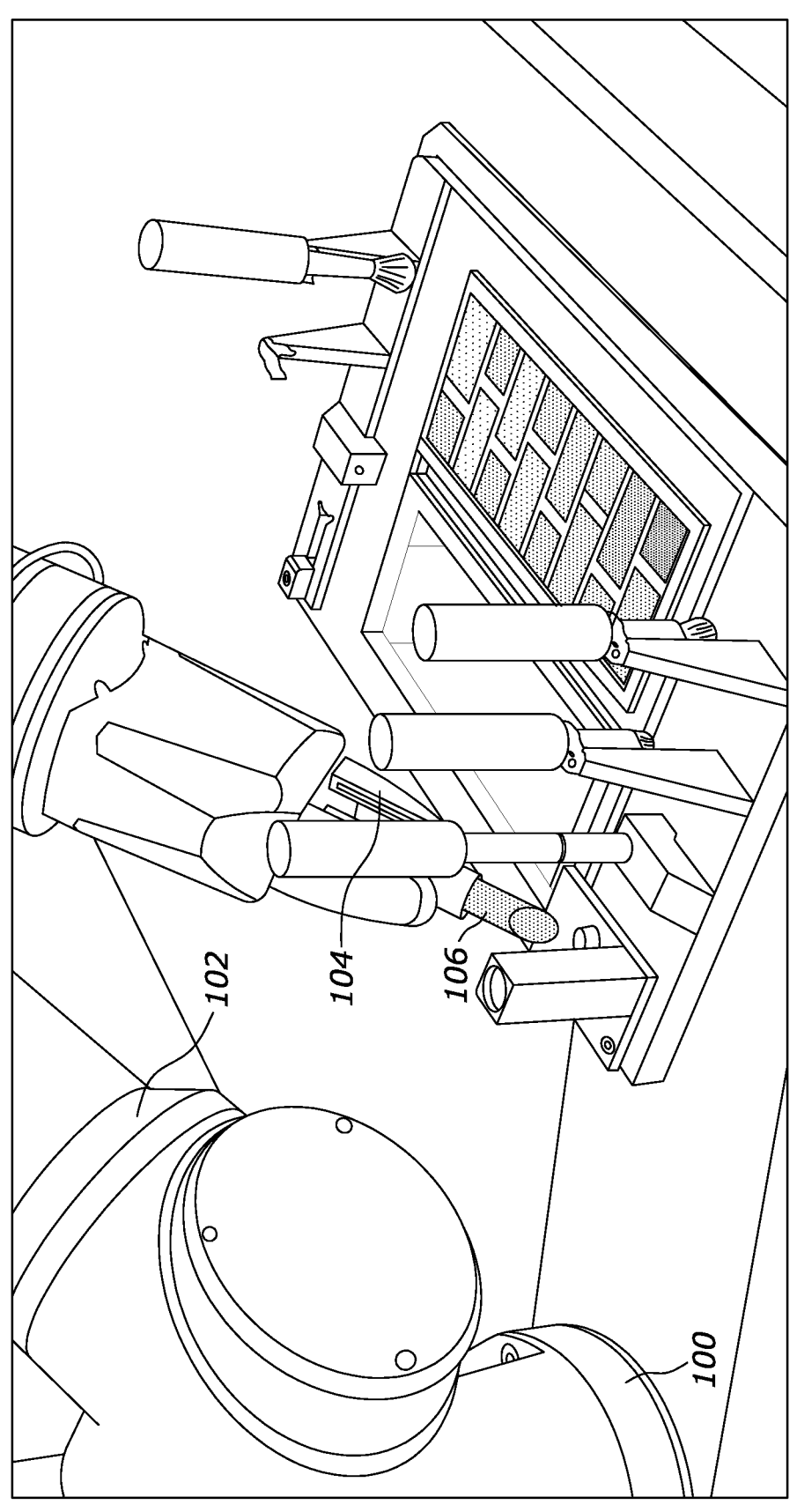
Figure 1E:
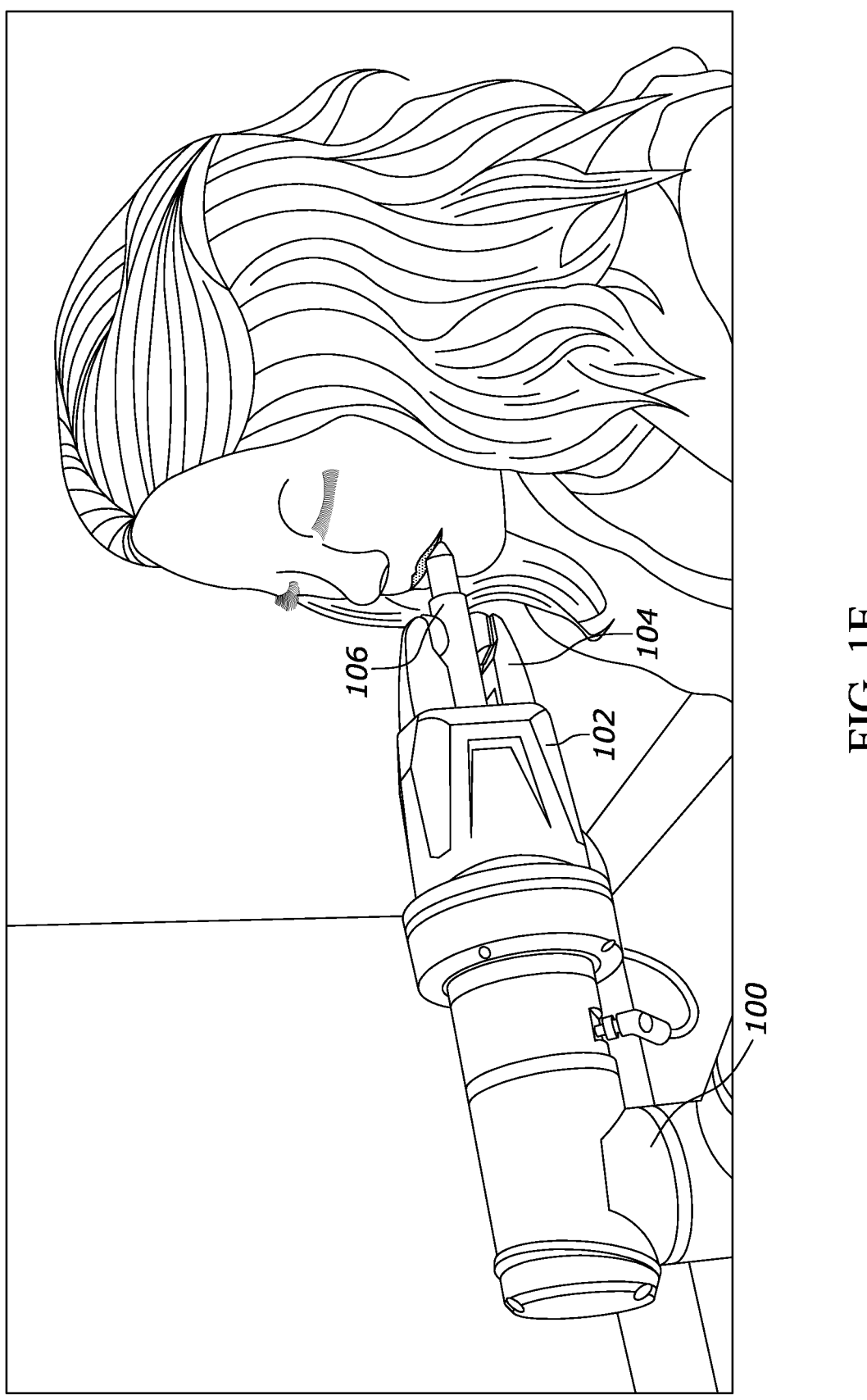

As shown in FIG. 1D, the robotic cosmetic application device 100 may utilize an arm 104 to dip an applicator tool 106 into a dispenser or container containing a particular cosmetic product (in this case, a lip product such as a lipstick, lip gloss, lip balm, etc.), and dab off excess cosmetic product from the applicator tool 106 as needed. As shown in FIG. 1E, the robotic cosmetic application device 100 may utilize an arm 104 to move the applicator tool 106 to the user's face in order to apply the cosmetic product to a particular area of the user's face (in this case, the user's lips).

In a similar manner as shown with respect to FIGS. 1B-1D for the lip product applicator tool 106, the robotic cosmetic application device 100 may utilize the same arm 104, or other arms 104 to pick up, grab, or otherwise attach other types of applicator tools 106, and apply respective cosmetic products to the other types of applicator tools 106 (and dab off excess product if needed). For instance, an applicator tool 106 may include a brush for applying blush or other powder or cream based cosmetic products. As another example, an applicator tool 106 may include a wand or spoolie brush for applying mascara, eyebrow tint, eyebrow gel, or other cosmetic products. As still another example, an applicator tool 106 may include a lipstick tube, crayon, or pencil for applying lipstick, lip gloss, lip tint, eyeshadow, eyeliner, or other cosmetic products. In various embodiments, the applicator tools 106 may include a sponge applicator tool, a puff applicator tool, a pencil applicator tool, a felt tip applicator tool, a marker applicator tool, a crayon applicator tool, a lip stick applicator tool, a lip gloss applicator tool, a roller applicator tool, etc., or any other suitable applicator tool for applying a cosmetic product.

Figure 1F:
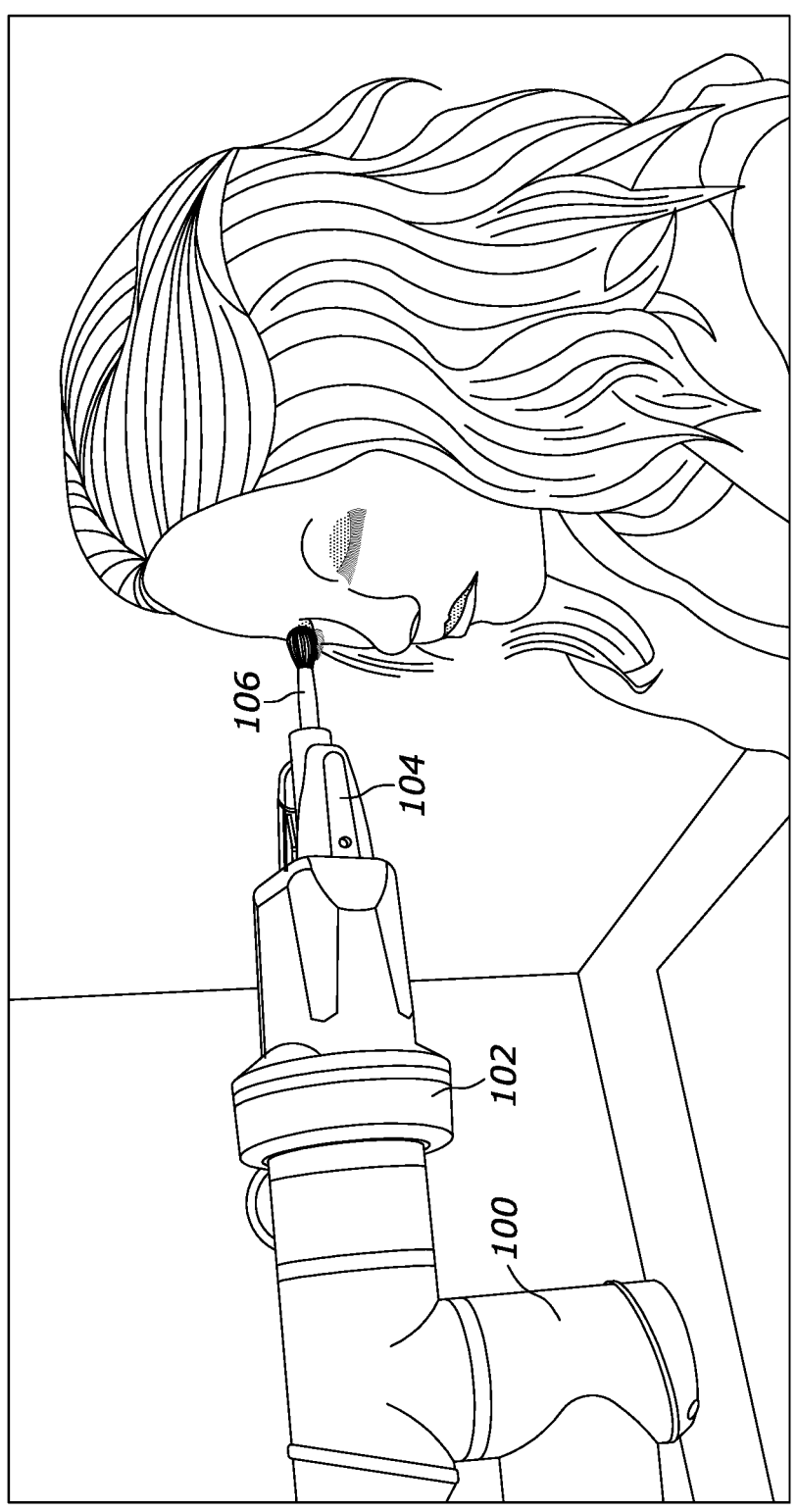
Figure 1G:
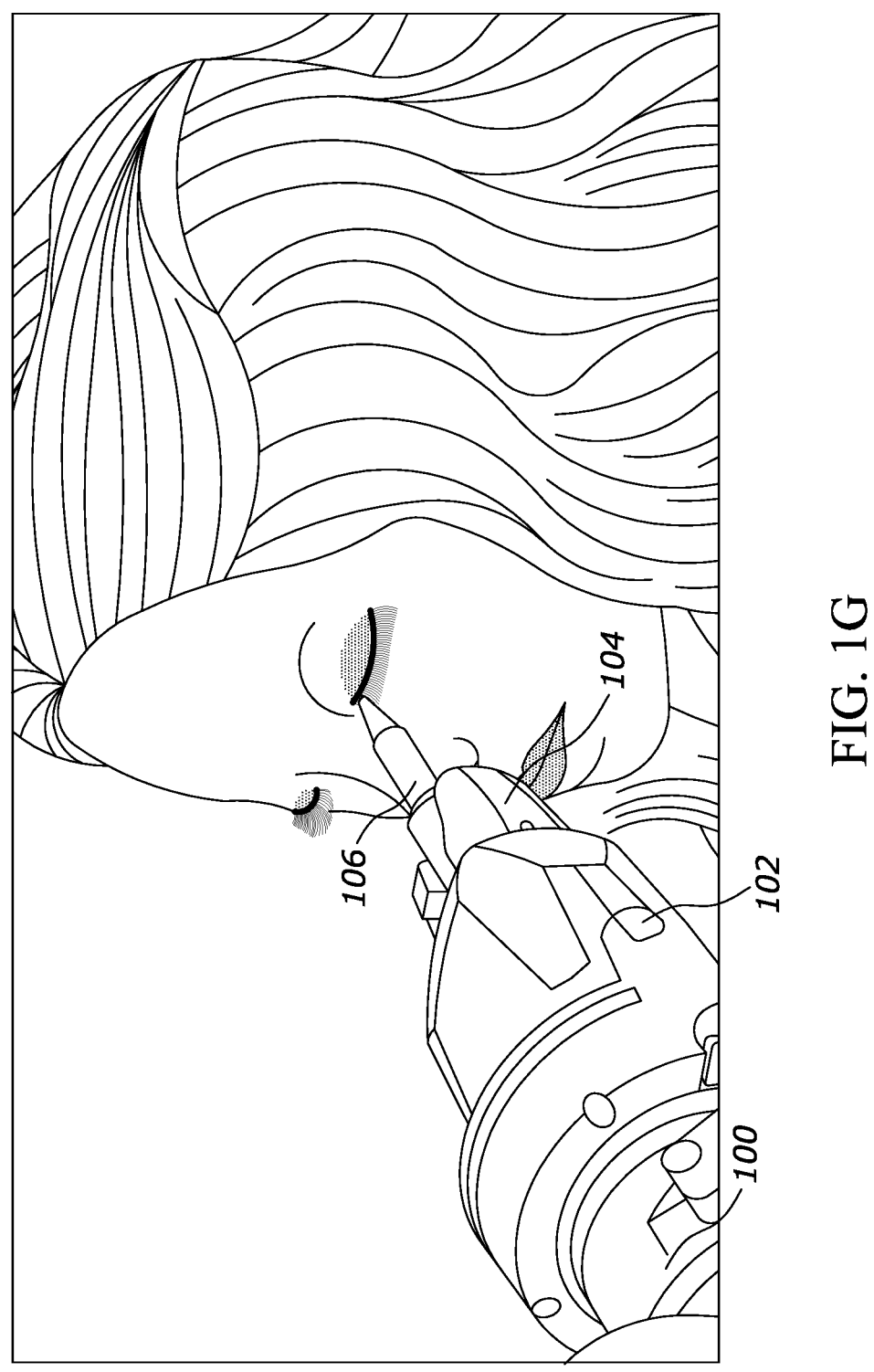

For example, as shown in FIG. 1F, the robotic cosmetic application device 100 may utilize an arm 104 to move an eyeshadow applicator tool 106 to the user's face in order to apply an eyeshadow product to the user's eyelids. As another example, as shown in FIG. 1G, the robotic cosmetic application device 100 may utilize an arm 104 to move an eyeliner applicator tool 106 to the user's face in order to apply an eyeliner product to the user's eyelids. In other examples, the robotic cosmetic application device 100 may utilize an arm 104 to move various applicator tools 106 to the user's face in order to apply respective cosmetic products to the various areas of the user's face.

In some examples, the robotic cosmetic application device 100 may be a standalone device, such as a portable device, or a device integrated with a desk or vanity. Moreover, in some examples, the housing 102 of the robotic cosmetic application device 100 may be permanently or removably integrated with a prosthetic body part, such as a prosthetic arm, prosthetic hand, etc. of a user.

Example System

Figure 2:
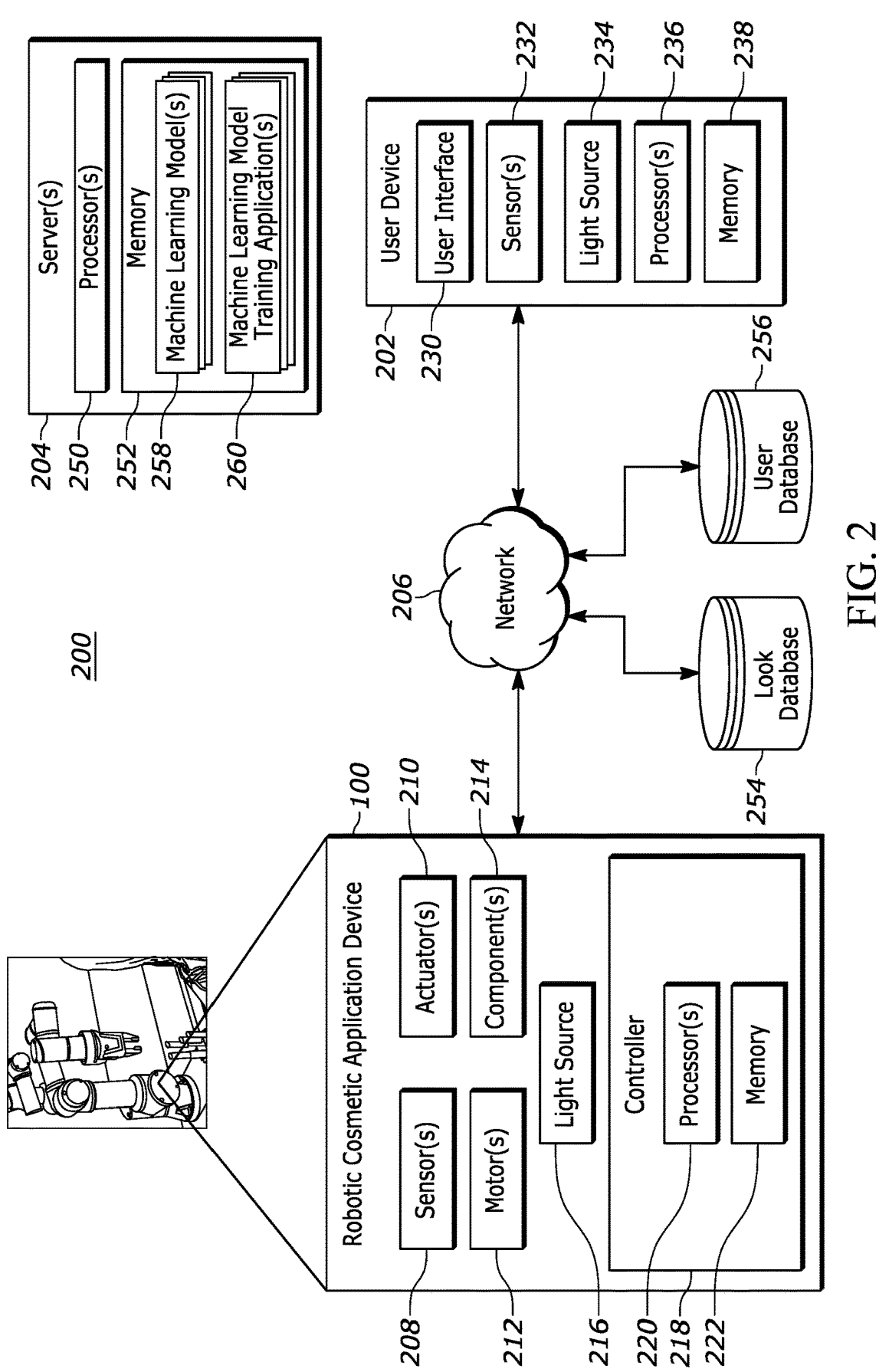
FIG. 2 depicts an exemplary computer system associated with a robotic cosmetic application device, according to some embodiments.

FIG. 2 depicts an exemplary computer system 200 for controlling a robotic cosmetic application device 100, according to one embodiment. The high-level architecture illustrated in FIG. 2 may include both hardware and software applications, as well as various data communications channels for communicating data between the various hardware and software components, as is described below.

The system 200 may include a robotic cosmetic application device 100 as well as, in some cases, one or more user computing devices 202 (which may include, e.g., smart phones, smart watches or fitness tracker devices, tablets, laptops, virtual reality toolsets, smart or augmented reality glasses, wearables, heads up display (HUD) devices, or any suitable mobile devices, etc.), and/or one or more server(s) 204. The robotic cosmetic application device 100, user device(s) 202, and/or server(s) 204 may be configured to communicate with one another via a wired or wireless computer network 206, and/or via short range signals, such as BLUETOOTH signals.

Although one robotic cosmetic application device 100, one user device 202, one server 204, and one network 206 are shown in FIG. 2, any number of such robotic cosmetic application devices 100, user devices 202, servers 204, and networks 206 may be included in various embodiments. To facilitate such communications, the robotic cosmetic application device 100, user devices 202, and/or servers 204 may each respectively comprise a wireless transceiver to receive and transmit wireless communications.

The robotic cosmetic application device 100 may include one or more sensors 208, one or more actuators 210, one or more motors 212, one or more components 214, and/or one or more light sources 216 configured to provide light to the face of the user. Additionally, the robotic cosmetic application device 100 may include a controller 218, including one or more processor(s) 220, as well as one or more computer memories 222.

Generally speaking, the sensors 208 may be configured to capture real-time data associated with the face of a user as the robotic cosmetic application device 100 applies a cosmetic product. The sensors 208 may include, for instance, a camera and/or a depth sensor configured to capture data associated with the user's face, distances from various features of the user's face to the robotic cosmetic application device 100, data associated with various cosmetic products to be applied to the user's face and/or their packaging, etc. Moreover, the sensors 208 may include sensors (e.g., the camera and/or the depth sensor, or additional or alternative sensors) configured to capture biometric data associated with the user, such as facial recognition data, fingerprint recognition data, iris recognition data, etc.

The one or more actuators 210 may be configured to, in conjunction with the one or more motors 212, automatically move and/or adjust the one or more components 214, such as the arms and/or the (in some cases, interchangeable) applicator tools 106 discussed with respect to FIG. 1A-1G, based on commands/instructions provided by the controller 218. That is, the one or more actuators 210 and/or the one or more motors 212 may automatically move and/or adjust the or more components 214 in real-time as the robotic cosmetic application device 100 applies a cosmetic product to the user's face. For instance, the one or more actuators 210 and/or the one or more motors 212 may automatically spin and/or twist the or more components 214, and/or may move the one or more components 214 laterally, vertically, or in other directions with respect to the user's face to apply the cosmetic product in a particular pattern or shape, and/or to increase or decrease pressure as the cosmetic product is applied.

As discussed above, the one or more components 214 may include the applicator tools 106.

Furthermore, the one or more components 214 may include, for instance, a user interface component configured to receive inputs and selections from the user of the robotic cosmetic application device 100, and/or to provide audible or visual feedback to the user of the robotic cosmetic application device 100.

Figures 3A, 3B:
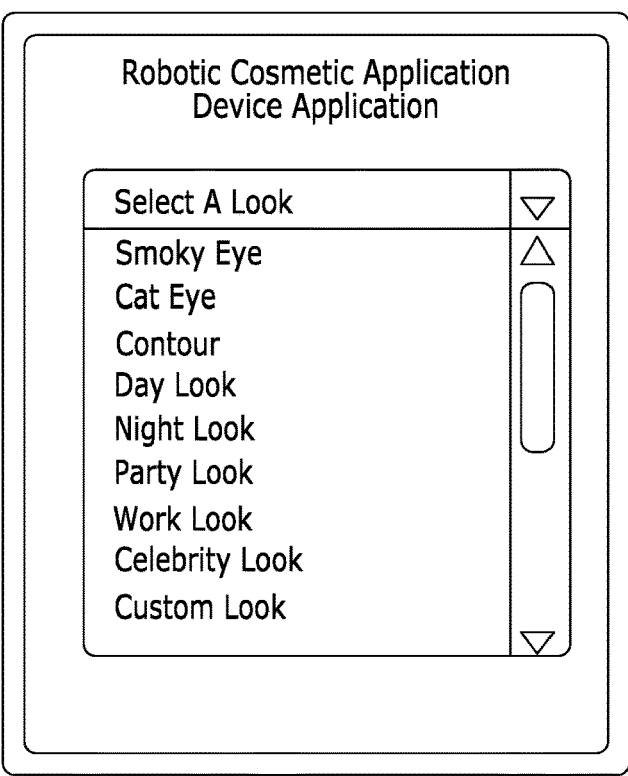
FIGS. 3A-3C depict examples of displays as may be provided by a user interface associated with a robotic cosmetic application device, according to some embodiments.
Figure 3C:
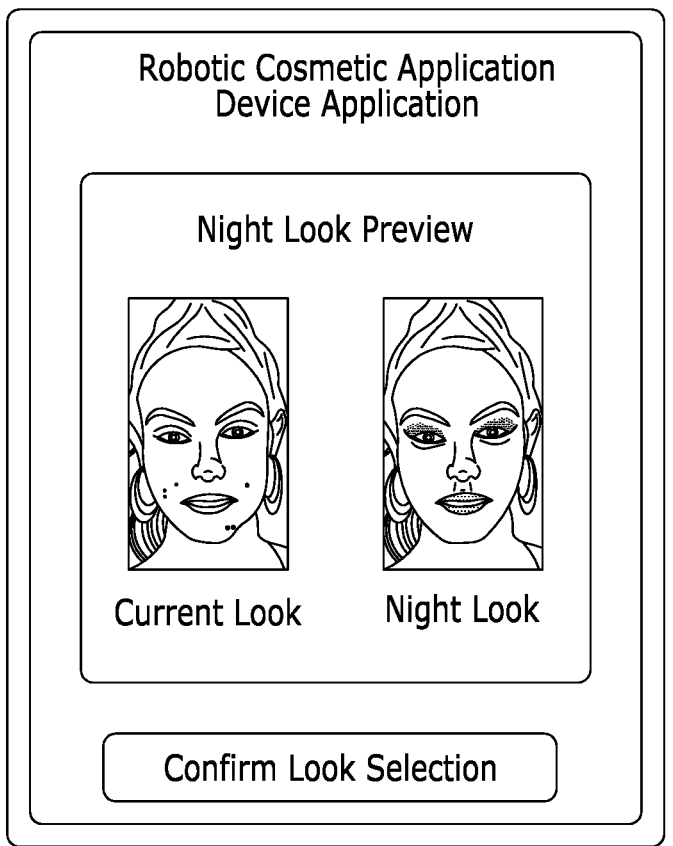

For instance, the user interface component 214 may provide interactive displays via which users may select a desired makeup look to be applied via the robotic cosmetic application device 100. The user may select a pre-existing look associated with pre-existing specifications for the robotic cosmetic application device 100 to follow when applying the look, or may customize specifications for the robotic cosmetic application device 100 to follow when applying the look. Additionally, the user may provide an image or a social media link which may be analyzed to determine the specifications for the robotic cosmetic application device 100 to follow when applying the look. For instance, these specifications may include types of makeup applied to each area of the face, heaviness of makeup applied to each area of the face, particular patterns, shapes, or borders of makeup applied to each area of the face, layers of makeup applied to each area of the face, etc. Examples of such displays are shown at FIGS. 3A-3C below. In some examples, the user interface component may further include an augmented reality (AR) component configured to generate and display an AR rendering of three-dimensional map of the user's face, and/or a selected makeup look as applied to the user's face. For example, in some cases, the AR rendering may be overlaid upon an image or video of the user's face as captured in real-time by the sensors 208 or 232, to illustrate the appearance of the selected makeup look as applied to the user's face.

Moreover, in some examples, the user interface component 214 may be configured to receive feedback from a user associated with a selected makeup look after the selected makeup look is applied via the robotic cosmetic application device 100. Furthermore, the user interface component 214 may provide additional alerts, notifications, communications, etc., as discussed elsewhere herein.

Additionally, the one or more components 214 may include, for instance, one or more dispensers for cosmetic products, configured to dispense various cosmetic products, based on commands/instructions provided by the controller 218. For example, the dispensers may dispense particular cosmetic products to particular applicator tools associated with such products (e.g. a mascara dispenser may dispense mascara to a mascara brush applicator tool, a blush dispenser may dispense blush powder to a brush applicator tool, etc.). Furthermore, the one or more components 214 may include, for example, one or more temperature control components configured to maintain temperature associated with the various cosmetic products stored in the various dispensers.

Moreover, the one or more components 214 may include, for instance, one or more cleaning components configured to clean and/or disinfect other of the components 214 (such as, e.g., the arms 104, the (in some cases, interchangeable) applicator tools 106, the dispensers, the user interface, etc.), and/or the housing 102, of the robotic cosmetic application device 100, based on commands/instructions provided by the controller 218.

The memories 222 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. Memorie(s) 222 may store an operating system (OS) (e.g., iOS, Microsoft Windows, Linux, UNIX, etc.) capable of facilitating the functionalities, apps, methods, or other software as discussed herein.

Generally speaking, the memorie(s) 222 may store instructions that, when executed by the processor(s) 220, cause the processors 220 to receive an indication of a makeup look selected by a user (e.g., from a user interface component 214 of the robotic cosmetic application device 100, or from a user interface 230 of an associated user device 202), and instructions that, when executed by the controller 218, cause the robotic cosmetic application device 100 to apply a cosmetic product based on the selected makeup look.

For instance, the memorie(s) 222 may store instructions that, when executed by the processor(s) 220, cause the processor(s) 220 to detect whether a particular applicator tool 106 is attached to the housing 102 (and, in some cases, to provide a prompt via a user interface component of the robotic cosmetic application device 100, or via the user interface 230 of the user device 202, for the user to attach a particular applicator tool 106 associated with the selected makeup look).

Furthermore, the memorie(s) 222 may store instructions that, when executed by the processor(s) 220, cause the processor(s) 220 to analyze images associated with cosmetic products to identify particular cosmetic products or characteristics thereof. For instance, the memorie(s) 222 may store instructions that, when executed by the processor(s) 220, cause the processor(s) 220 to capture image data (e.g., via the sensors 208 and/or sensors 232) associated with packaging of various cosmetic products (i.e., cosmetic products to be added to integrated dispensers of the robotic cosmetic application device 100, and/or cosmetic products stored separately from the robotic cosmetic application device 100), and analyze the image data associated with the packaging of the various cosmetic products to identify respective cosmetic products based on their packaging. For instance, in some examples, this analysis may include using object recognition techniques to identify a likely type of cosmetic product and/or likely properties associated with the cosmetic product based on the image. Moreover, in some examples, this analysis may include analyzing an image of the cosmetic product packaging using optical character recognition techniques to identify one or more letters, numbers, words, codes, etc., on the cosmetic product packaging, and accessing a database associated with cosmetic products to match any identified letters, numbers, words, codes, etc., on the cosmetic product packaging with particular cosmetic products and/or particular properties associated therewith. As another example, this analysis may include analyzing an image of the cosmetic product packaging to identify and/or decode a barcode, QR code, etc. For instance, the payload of the barcode, QR code, etc., may include an identification or indication of the cosmetic product and/or properties associated therewith.

The memorie(s) 222 may store instructions that, when executed by the processor(s) 220, cause the processor(s) 220 to identify an available cosmetic product that is appropriate for a particular element of the selected look and/or the current applicator tool component 214, and the memorie(s) 222 may store instructions that, when executed by the processor(s) 220, cause the controller 218 to control one or more dispenser components 214 to dispense a particular cosmetic product to a particular attached applicator tool component 214, and/or instructions that, when executed by the processor(s) 220, cause the controller 218 to control one or more applicator tool components 214 to dip into the dispenser components 214, or into separately packaged cosmetic containers or dispensers, such that an appropriate cosmetic product is applied to a particular attached applicator tool component 214.

Furthermore, the memorie(s) 222 may store instructions that, when executed by the processor(s) 220, cause the controller 218 to control the actuators 210 and/or motors 212 to automatically adjust an arm 104 and/or an applicator tool 106 of the robotic cosmetic application device 100 in real-time, to apply the cosmetic product to the user's face based on the selected makeup look.

In particular, the instructions stored on the memorie(s) 222 may cause the processors 220 to analyze real-time sensor data captured by the sensors 208 (and/or external sensors, such as sensors 232 of a user device 202) in order to generate a three-dimensional map associated with the user's face and identify the locations of one or more facial features (e.g., eyes, eyelids, eyebrows, eyelashes, cheeks, cheekbones, nose, lips, chin, etc.) of the user's face on the three-dimensional map. The instructions stored on the memorie(s) 222 may cause the processors 220 to analyze real-time sensor data captured by the sensors 208 (and/or external sensors, such as sensors 232 of a user device 202) in order to determine the location of the robotic cosmetic application device 100 (and/or one or more arms 104, applicator tools 106, etc., thereof) with respect to the facial features of the user's face, and may cause the controller 218 to control the actuators 210 and/or motors 212 to automatically adjust an arm 104 and/or applicator tool 106 of the robotic cosmetic application device 100 to apply a cosmetic product based on the selected makeup look, based on the determined location of the robotic cosmetic application device.

For instance, when a lipstick applicator tool of the robotic cosmetic application device 100 is close to or touching the lips of the user's face, the instructions stored on the memorie(s) 222 may cause the controller 218 to control the arm 104 and/or the lipstick applicator tool 106 to apply pressure in real-time as the robotic cosmetic application device 100 moves the applicator tool 106 across the user's lips, in order to apply lipstick in accordance with a selected makeup look that includes lipstick, in some cases including lipstick within the edges of the lips for some lipstick looks, or in some cases extending outside of the edges of the lips for an over-lined lipstick look. As another example, when a mascara wand applicator tool 106 of the robotic cosmetic application device 100 is close to or touching the eyelashes of the user's face, the instructions stored on the memorie(s) 222 may cause the controller 218 to control the arm 104 and/or the mascara wand applicator tool 106 to slowly spin or stroke in a vertical direction in real-time as the robotic cosmetic application device 100 moves the applicator tool 106 over the user's eyelashes, in order to apply mascara in accordance with a selected makeup look that includes mascara, in some cases including multiple coats of mascara for a selected makeup look including heavier mascara. As still another example, when an eyeliner applicator tool of the robotic cosmetic application device 100 is close to or touching the edge of the eyelid of the user's face, the instructions stored on the memorie(s) 222 may cause the controller 218 to control the arm and/or the eyeliner applicator tool to adjust the eyeliner applicator tool vertically or laterally in real-time as the robotic cosmetic application device 100 moves the applicator tool 106 over the user's eyelid, in order to apply eyeliner in accordance with a selected makeup look that includes eyeliner (e.g., in a straight line with a pointed tip extending from the eye for a winged or cat-eye look, in a smudged line near the eyelid for a smoky-eye look, etc.).

The instructions stored on the memorie(s) 222 may cause a user interface component 214 to provide audible or visible feedback, guidance, or tutorials to the user in real-time as the robotic cosmetic application device 100 applies the makeup look, or may send such feedback, guidance, or tutorials to another device (such as the user device 202) for display via the user interface of that device (e.g., the user interface 230).

Moreover, the instructions stored on the memorie(s) 222 may cause the controller 218 to adjust the movement of the arm and/or applicator tool components 214 based on conditions associated with the user's skin as detected in real-time, e.g., based on data captured by the sensors 208 or sensors 232. For instance, the instructions stored on the memorie(s) 222 may cause the processor(s) 220 to analyze image data captured by the sensors 208 or sensors 232 to detect blemishes of the user's skin, and may, for instance, cause the controller 218 to adjust the movement of the arm and/or applicator tool components 214, such that additional cosmetic products or additional coats of cosmetic products, special cosmetic products specifically designed for blemishes, are applied to the affected area. Furthermore, in some examples, the instructions stored on the memorie(s) 222 may cause the processor(s) 220 to analyze image data captured by the sensors 208 or sensors 232 to detect skin health conditions, injuries, reactions, etc., of the user's skin, and may, in some cases, cause the controller 218 to adjust or cease the movement of the arm and/or applicator tool components 214 to avoid further irritating or injuring any detected skin health conditions, injuries, reactions etc. Furthermore, in some examples, the instructions stored on the memorie(s) 222 may cause the processor(s) 220 to generate an alert based on the detected skin health condition, injury, reaction, etc., and provide the alert, e.g., via a user interface component 214 and/or via the user interface 230.

Furthermore, in some examples, the instructions stored on the memorie(s) 222 may cause the processor(s) 220 and/or the controller 218 to perform any or all of the steps of the method 400 discussed below with respect to FIG. 4.

The user device 202 may include, or may be configured to communicate with, a user interface 230, which may receive input from users and may provide audible or visible output to users in a similar manner as discussed above with respect to the user interface component 214 of the robotic cosmetic application device 100. Furthermore, the user device 202 may include, or may be configured to communicate with, one or more respective sensors 232, which may include similar sensors and/or sensor functionality as discussed above with respect to the sensors 208 of the robotic cosmetic application device 100. Additionally, the user device 202 may include, or may be configured to communicate with one or more light sources 234 configured to provide light to the face of the user of the robotic cosmetic application device 100.

Moreover, the user device 202 may include one or more processor(s) 236, as well as one or more computer memories 238. Memories 238 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. Memorie(s) 238 may store an operating system (OS) (e.g., iOS, Microsoft Windows, Linux, UNIX, etc.) capable of facilitating the functionalities, apps, methods, or other software as discussed herein. The memorie(s) 238 may store instructions that, when executed by the processor(s) 236, cause the processor (s) 236 to receive input from a user as provided via the user interface 230 (e.g., via interactive user interface display screens discussed below with respect to FIGS. 3A-3C), and send the received user input to the robotic cosmetic application device 100 (e.g., via the network 206), in some cases responsive to a request for such user input from the robotic cosmetic application device 100. Furthermore, in some examples, the memorie(s) 238 may store instructions that, when executed by the processor(s) 236, cause the processor (s) 236 to capture sensor data via one or more sensors 232, in some cases responsive to a request for particular sensor data from the robotic cosmetic application device 100, and may send the captured sensor data to the robotic cosmetic application device 100. Moreover, in some examples, the memorie(s) 238 may store instructions that, when executed by the processor(s) 236, cause the processor(s) 236 to provide light to the face of the user via a light source 234, in some cases responsive to a request from the robotic cosmetic application device 100 to provide light to the face of the user. In some examples, the request may include a request for a particular lighting parameters, such as a particular level/intensity of light, or a particular warmth or color of light, and the processor(s) 236 may in turn cause the light source 234 to provide the requested level/intensity, color, warmth, etc. of light to the face of the user.

Furthermore, in some examples, the instructions stored on the memorie(s) 238 may cause the processor(s) 236 to perform any or all of the steps of the method 400 discussed below with respect to FIG. 4.

In some embodiments the server 204 may comprise one or more servers, which may comprise multiple, redundant, or replicated servers as part of a server farm. In still further aspects, such server(s) 204 may be implemented as cloud-based servers, such as a cloud-based computing platform. For example, such server(s) 204 may be any one or more cloud-based platform(s) such as MICROSOFT AZURE, AMAZON AWS, or the like. Such server(s) 204 may include one or more processor(s) 250 (e.g., CPUs) as well as one or more computer memories 252.

The memories 252 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. Memorie(s) 252 may store an operating system (OS) (e.g., Microsoft Windows, Linux, UNIX, etc.) capable of facilitating the functionalities, apps, methods, or other software as discussed herein. The memorie(s) 252 may store one or more machine learning models 258, and/or one or more respective machine learning model training applications 260. These machine learning models 258 may include, for instance, a machine learning model trained to analyze data associated with a user's face and/or a three-dimensional map associated with the user's face to identify facial features thereon, a machine learning model trained to analyze images associated with makeup looks to identify cosmetic products and/or techniques used to create the makeup looks, a machine learning model trained to analyze data associated with the user's skin to identify a skin type or a skin health condition associated with the user, a machine learning model trained to analyze data associated with previous makeup looks selected by a user to predict additional makeup looks for the user, etc.

Additionally, or alternatively, the memorie(s) 252 may store makeup look data, and/or user data. The makeup look data may include, for instance, specifications associated with various makeup looks, and may also be stored in a look database 254 (or in multiple such databases), which may be accessible or otherwise communicatively coupled to the server 204. The user data may include previous makeup looks worn by the user, user preferences, and various other data associated with the user, and may also be stored in a user database 256 (or in multiple such databases), which may be accessible or otherwise communicatively coupled to the server 204. Furthermore, in some examples, the makeup look data and the user data may be stored in the same database, which may be accessible or otherwise communicatively coupled to the server 204.

Furthermore, the memorie(s) 252 may store instructions that, when executed by the processors 250, cause the processors 250 to receive data from various databases such as the databases 254 and 256, and/or data from the robotic cosmetic application device 100 and/or the user device 202 (e.g., via the network 206). The data from the robotic cosmetic application device 100 and/or the user device 202 may include, for instance, data captured by the sensors 208 of the robotic cosmetic application device 100 and/or data captured by the sensors 232 of the user device 202, data input by a user via a user interface component 214 of the robotic cosmetic application device and/or data input by a user via the user interface 230 of the user device 202, etc. The instructions stored on the memorie(s) 252, when executed by the processors 250, may cause the processors 250 to analyze data received from the database, and/or the robotic cosmetic application device 100 and/or the user device 202 in order to make an identification or a prediction based on the received data, and subsequently send the identification and/or prediction to the robotic cosmetic application device 100 and/or the user device 202. For instance, this analysis and identification and/or prediction may be based upon applying a trained machine learning model 258 to the data received from the databases and/or the robotic cosmetic application device 100 and/or the user device 202.

In some examples, one or more machine learning model(s) 258 may be executed on the server 204, while in other examples one or more machine learning model(s) 258 may be executed on another computing system, separate from the server 204. For instance, the server 204 may send data to another computing system, where a trained machine learning model 258 is applied to the data, and the other computing system may send a prediction or identification, based upon applying the trained machine learning model 258 to the data, to the server 204. Moreover, in some examples, one or more machine learning model 258 (s) may be trained by respective machine learning model training application(s) 260 executing on the server 204, while in other examples, one or more machine learning model(s) 258 may be trained by respective machine learning model training application(s) executing on another computing system, separate from the server 204.

Whether the machine learning model(s) 258 are trained on the server 204 or elsewhere, the machine learning model(s) 258 may be trained by respective machine learning model training application(s) 260 using training data (including historical data in some cases), and the trained machine learning model(s) 258 may then be applied to new/current data that is separate from the training data in order to determine, e.g., predictions and/or identifications related to the new/current data.

For example, a machine learning model 258 trained to analyze data associated with a user's face and/or a three-dimensional map associated with the user's face to identify facial features thereon may be trained by a machine learning model training application 260 using training data including images of various faces and/or three-dimensional maps associated with the various faces, and indications of locations of facial features in the images and/or three-dimensional maps. For instance, each image and/or three-dimensional map may be labeled to indicate locations of facial features such as the eyes, eyelids, eyebrows, eyelashes, cheeks, cheekbones, nose, lips, chin, etc. on the face, and these labeled images and/or three-dimensional maps may be used as training data. Once sufficiently trained using this training data, such a machine learning model 258 may be applied to a new image, video, and/or three-dimensional map associated with a user's face (e.g., an image or video captured by the sensors 208, 232, etc., in real-time), and may identify likely locations of various facial features of the user's face.

As another example, a machine learning model 258 trained to analyze images associated with makeup looks to identify cosmetic products and/or techniques used to create the makeup looks may be trained by a machine learning model training application 260 using training data including images of individuals with various makeup looks applied, and indications of cosmetic products and/or techniques that were used to create the looks shown in the images. For instance, an image of an individual wearing a particular makeup look may be labeled with a particular color or brand of mascara, blush, lipstick, foundation, etc., used to create the look, as well as types of applicators used to create the look, number of coats/layers of each cosmetic product, techniques such as motions, patterns, shapes, or lines used to create the look, etc., and these labeled images may be used as training data. Once sufficiently trained using this training data, such a machine learning model 258 may be applied to a new image, such as an image provided by a user via a user interface component 214 and/or a user interface 230, or an image from a social media link provided by the user via the user interface component 214 and/or a user interface 230, and may identify/predict cosmetic products and/or techniques that may be used to replicate the makeup look shown in the image. In some examples, the machine learning model 258 may further generate specifications to be used by the robotic cosmetic application device 100 when replicating the makeup look shown in the image.

Moreover, as another example, a machine learning model 258 trained to analyze data associated with the user's skin to identify a skin type or a skin health condition associated with the user may be trained by a machine learning model training application 260 using training data including images or other sensor data associated with various individuals' skin, and indications of skin types, skin health conditions, or other skin characteristics associated with the various individuals' skin. For instance, images of individuals having various skin types may be labeled with the respective skin types shown in each image. Similarly, images of individuals having various skin health conditions may be labeled with an indication of the health condition, the location of visual indicators associated with the health condition shown in the image, etc. Furthermore, images of individuals having various skin characteristics may be labeled with the respective skin characteristics. These labeled images may be used as training data, and once sufficiently trained using this training data, such a machine learning model 258 may be applied to a new image, video, and/or three-dimensional map associated with a user's face (e.g., an image or video captured by the sensors 208, 232, etc., in real-time), and may identify/predict a skin type, skin health condition, and/or other skin characteristic associated with the user's face.

Additionally, as another example, a machine learning model 258 trained to analyze data associated with previous makeup looks selected by a user to predict additional makeup looks for the user may be trained by a machine learning application 260 using training data including makeup looks selected by previous users, characteristics of the previous users, input/feedback from the previous users about the makeup looks, once applied by a robotic cosmetic application device 100, etc. For instance, various makeup looks may be labeled with indications of characteristics of users who gave positive feedback regarding the makeup looks, indications of other looks receiving positive feedback from the same users, etc. Once sufficiently trained using this training data, such a machine learning model 258 may be applied to a user, the user's characteristics, and previous makeup looks selected/liked by the user, and may predict/suggest other makeup looks that the user may enjoy.

In various aspects, the machine learning model(s) 258 may comprise machine learning programs or algorithms that may be trained by and/or employ neural networks, which may include deep learning neural networks, or combined learning modules or programs that learn in one or more features or feature datasets in particular area(s) of interest.

The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques.

In some embodiments, the artificial intelligence and/or machine learning based algorithms used to train the machine learning model(s) 258 may comprise a library or package executed on the server 204 (or other computing devices not shown in FIG. 2). For example, such libraries may include the TENSORFLOW based library, the PYTORCH library, and/or the SCIKIT-LEARN Python library.

Machine learning may involve identifying and recognizing patterns in existing data (such as training a model based upon historical data) in order to facilitate making predictions or identification for subsequent data (such as using the machine learning model on new/current data order to determine a prediction or identification related to the new/current data).

Machine learning model(s) may be created and trained based upon example data (e.g., "training data") inputs or data (which may be termed "features" and "labels") in order to make valid and reliable predictions for new inputs, such as testing level or production level data or inputs. In supervised machine learning, a machine learning program operating on a server, computing device, or otherwise processor(s), may be provided with example inputs (e.g., "features") and their associated, or observed, outputs (e.g., "labels") in order for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, computing device, or otherwise processor(s), to predict, based upon the discovered rules, relationships, or model, an expected output.

In unsupervised machine learning, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated. The disclosures herein may use one or both of such supervised or unsupervised machine learning techniques.

In addition, memories 252 may also store additional machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For instance, in some examples, the computer-readable instructions stored on the memory 252 may include instructions for carrying out any of the steps of the method 400 via an algorithm executing on the processors 250, which is described in greater detail below with respect to FIG. 4. It should be appreciated that one or more other applications may be envisioned and that are executed by the processor(s) 252. It should be appreciated that given the state of advancements of mobile computing devices, any or all of the processes functions and steps described herein may be present together on a mobile computing device, such as the user device 202, or the robotic cosmetic application device 100.

Example User Interface Displays

FIGS. 3A-3C depict exemplary user interface displays as may be provided by a user interface of the robotic cosmetic application device (e.g., a component 214 of the robotic cosmetic application device 100) and/or of an associated user device (e.g., user device 202). For instance, FIG. 3A illustrates an example user interface display via which a user may select a makeup look, and FIG. 3B illustrates an example user interface display via which a user has already selected a makeup look. For instance, the user may select between pre-set options such as "smoky eye," "cat eye," "contour," "day look," "night look," "party look," "work look," "celebrity look," etc. In some examples, the pre-set options may differ based on, for instance, whether a user is subscribed to a makeup look subscription service, or whether the user is operating the robotic cosmetic application device 100 in a "professional" mode compared to an "amateur" mode. Some of these options may include still-further options (not shown)—for instance, a user may select a specific celebrity for a "celebrity look," or may select options for each facial feature to create a custom look. These options may include, for instance, types of products applied, how heavily each of the products are applied to each facial area, etc. Furthermore, in some examples, the user may be prompted to upload an image of a desired look, or a link to a social media post including a desired look, which may be analyzed to generate specifications associated with the desired look for use by the robotic cosmetic application device 100.

FIG. 3C illustrates an example preview of the look selected by the user at FIG. 3B. In some examples, the preview may be a generalized preview, e.g., illustrating examples of other individuals to whom the look has been applied, or illustrating examples of a three-dimensional rendering of the look as applied to a three-dimensional model of a face. As shown in FIG. 3C, the preview includes a rendering of the user's current look and a rendering of a predicted look including the selected makeup look. Furthermore, as shown in FIG. 3C, the preview includes an option to confirm the selected look. Upon confirming the selected look, the specifications associated with the selected look may be sent to the robotic cosmetic application device 100 to be applied to the face of the user.

Example Method

FIG. 4 depicts a flow diagram of an exemplary computer-implemented method for controlling a robotic cosmetic application device, according to one embodiment. One or more steps of the method 400 may be implemented as a set of instructions stored on a computer-readable memory (e.g., memory 222, memory 238, memory 252, etc.) and executable on one or more processors (e.g., processor 220, processor 236, processor 250, etc.).

The method 400 may include receiving (block 402), from a user interface (e.g., user interface 230 discussed with respect to FIG. 2) associated with the robotic cosmetic application device, an indication of a makeup look selected by the user. In some examples, the user interface may be integrated into the robotic cosmetic application device, while in other examples, the user interface may be part of a separate device, such as a user device (e.g., the user device 202, as discussed with respect to FIG. 2), and/or another separate device. In embodiments in which the user interface is part of a separate device, receiving the indication of the makeup look selected by the user may include the robotic cosmetic application device receiving the indication of the makeup look selected by the user at a communication interface of the robotic cosmetic application device, e.g., via a network (e.g., network 206), via a short range signal between the separate device and the robotic cosmetic application device, and/or via a wired connection between the separate device and the robotic cosmetic application device.

For instance, the user interface may provide a listing of possible makeup looks from which the user may select a makeup look. In some examples, the listing of possible makeup looks may include an indication of which makeup looks have previously been selected by the user. Moreover, in some examples, the listing of possible makeup looks may be modified (to include more looks, fewer looks, or otherwise different looks) based on whether the user is subscribed to a makeup look subscription service. Additionally, in some examples, the listing of possible makeup looks may include an indication of one or more suggested makeup looks for the user. For example, the method 400 may include providing suggested makeup looks for the user based on previous looks selected by the user, based on current trends associated with one or more makeup looks, based on a mood of the user, based on preferences indicated by the user, based on an indication, from the user, of an event or setting at which the user will be wearing the makeup look, based on a time of day or year, etc.

In some examples, providing suggested makeup looks for the user based on previous looks selected by the user may include applying a trained machine learning model to previously selected looks in order to identify a suggested look for the user. For instance, the method 400 may include training a machine learning model using historical data associated with makeup looks selected by other users, and feedback associated therewith. Once trained, the machine learning model may be capable of predicting a makeup look for a user based on previous makeup looks selected by the user.

In some examples, prior to proceeding to the further steps of the method 400, the method 400 may include analyzing biometric data associated with the user (e.g., as captured by one or more integrated sensors, or sensors of a separate device) in order to determine whether the user is an authorized user of the robotic cosmetic application device. If the user is an authorized user of the robotic cosmetic application device, the method 400 may proceed, but if the user is not an authorized user of the robotic cosmetic application device, the method 400 may not proceed further, i.e., such that the operation of the robotic cosmetic application device is restricted to only authorized users.

Furthermore, the method 400 may include analyzing (block 404) real-time data associated with the face of the user captured by one or more sensors in order to generate a three-dimensional map associated with the face of the user. For instance, the sensors may include integrated sensors of the robotic cosmetic application device (e.g., sensors 208, as discussed with respect to FIG. 2). Additionally, the sensors may include sensors of a separate device, such as a user device (e.g., sensors 232 of the user device 202, as discussed with respect to FIG. 2), and/or another separate device. The sensors may include, for instance, cameras or depth sensors, or other suitable sensors.

In embodiments in which the sensors include sensors that are part of a separate device, the robotic cosmetic application device may request sensor data from, and/or receive sensor data captured by, the sensors of the separate device via a communication interface of the robotic cosmetic application device, e.g., via a network (e.g., network 206), via a short range signal between the separate device and the robotic cosmetic application device, and/or via a wired connection between the separate device and the robotic cosmetic application device.

Additionally, in some examples, the robotic cosmetic application device, and/or a separate device, may include one or more light sources. In such examples, the method 400 may include controlling light sources integrated into the robotic cosmetic application device to provide light to the face of the user as the sensor data is being captured, or sending a request to the separate device to cause the separate device to activate a light source to provide light to the face of the user as the sensor data is being captured, e.g., via a network (e.g., network 206), via a short range signal between the separate device and the robotic cosmetic application device, and/or via a wired connection between the separate device and the robotic cosmetic application device. For instance, in some examples, the method 400 may include determining optimized lighting parameters, such as an optimized level, warmth, and/or direction of light to be provided based on the selected makeup look, based on a particular cosmetic product being used, based on a particular step within the process of the selected makeup look being applied, and/or based on ambient lighting conditions in an area where the robotic cosmetic application device is being used, and may control an integrated light source to provide the optimized light level, warmth, and/or direction of light, or send a request to the separate device to provide the optimized light level, warmth, and/or direction of light.

In some examples, the method 400 may include generating an augmented reality (AR) version of the three-dimensional map of the face of the user, and displaying the AR version of the three-dimensional map of the face of the user via a user interface associated with the robotic cosmetic application device. As discussed above, in some examples, the user interface may be integrated into the robotic cosmetic application device, and the AR version of the three-dimensional map of the face of the user may be displayed via the user interface of the robotic cosmetic application device. In embodiments in which the user interface is part of a separate device, displaying the AR version of the three-dimensional map of the face of the user may include sending the AR version of the three-dimensional map of the face of the user to the separate device to be displayed by the user interface of the separate device, e.g., via a network (e.g., network 206), via a short range signal between the separate device and the robotic cosmetic application device, and/or via a wired connection between the separate device and the robotic cosmetic application device.

Additionally, the method 400 may include identifying (block 406) one or more facial features of the face of the user on the three-dimensional map associated with the face of the user. In some examples, this analysis may include applying a trained machine learning model to the three-dimensional map associated with the face of the user to identify the facial features. For instance, the method 400 may include training a machine learning model using historical three-dimensional maps associated with other faces, and corresponding portions of the three-dimensional maps associated with facial features of the other faces, and, once trained, the machine learning model may be capable of identifying such facial features on three-dimensional maps associated with new faces. That is, the trained machine learning model may be configured to recognize facial geometry associated with particular facial features on the three-dimensional map associated with a face. Certain facial geometry on a particular location of the face may correspond to the eyes of the face, while other facial geometry at another location of the face may correspond to the lips of the face, etc.

Moreover, in some examples, the method 400 may include generating a preview of the makeup look selected by the user as applied to facial features of the face of the user on the three-dimensional map associated with the face of the user. For instance, the method 400 may include generating an AR preview of the makeup look selected by the user as applied to facial features of the face of the user on the three-dimensional map associated with the face of the user. Furthermore, the method 400 may include generating an AR preview of the steps of the application process of the makeup look selected by the user to the facial features of the face of the user. For instance, the AR preview of the steps of the application process may include images associated with each step of the application process, and/or videos associated with each step of the application process. The method 400 may further include displaying the AR preview of the selected makeup look, and/or the AR preview of the steps of the application process for the selected makeup look, via an integrated user interface of the robotic cosmetic application device 100. In embodiments in which the user interface is part of a separate device, the method 400 may include sending the AR preview to the separate device to be displayed by the user interface of the separate device, e.g., via a network (e.g., network 206), via a short range signal between the separate device and the robotic cosmetic application device, and/or via a wired connection between the separate device and the robotic cosmetic application device.

Furthermore, the method 400 may include controlling (block 408) one or more robotic arm(s) of the robotic cosmetic application device (e.g., controlling the arm(s) 104, via the actuators 210 of the robotic cosmetic application device 100, discussed with respect to FIG. 2) to automatically adjust one or more applicator tools (e.g., the applicator tools 106, discussed with respect to FIG. 1A-1G) associated with respective cosmetic products in real-time as the robotic cosmetic application device applies the cosmetic products to face of the user, based on the locations of the arm(s) or applicator tool(s) with respect to the one or more facial features of the face of the user, to apply one or more cosmetic products to the face of the user in order to achieve the makeup look selected by the user, i.e., by applying particular cosmetic products to particular areas of the identified facial features of the face of the user.

The interchangeable applicator tools may include, for instance, a brush applicator tool, a sponge applicator tool, a puff applicator tool, a pencil applicator tool, a felt tip applicator tool, a marker applicator tool, a crayon applicator tool, a lip stick applicator tool, a lip gloss applicator tool, a roller applicator tool, a mascara wand applicator tool, and/or any other suitable applicator tools for applying cosmetic products to the face of the user. The method 400 may include automatically adjusting an angle, a pressure, a movement, a spin, etc., of the one or more arms and/or applicator tools of the robotic cosmetic application device based on one or more of: the cosmetic product being applied, the type of applicator tool, the particular makeup look selected, and/or a particular step in the application of the selected makeup look, to apply one or more cosmetic products to the face of the user.

For instance, the method 400 may further include analyzing the sensor data in real-time to identify properties of the skin of the user, properties of the environment of the user, and/or properties of the one or more cosmetic products being applied, and automatically adjusting the angle, pressure, movement, spin, etc., of the arms and/or the applicator tools based on one or more of: a skin type associated with the user, a skin health condition associated with the user, a hydration level of the skin of the user, a skin tone associated with the user, current temperature conditions, current humidity conditions, current precipitation conditions, current lighting conditions, a current time of day, and/or one or more properties associated with the one or more cosmetic products being applied. In some examples, this analysis may include applying a trained machine learning model to the sensor data to identify the properties of the skin of the user, the properties of the environment of the user, and/or the properties of the one or more cosmetic products being applied. For instance, the method 400 may include training a machine learning model using historical sensor data associated with skin properties, environmental properties, cosmetic product properties, etc., and, once trained, the machine learning model may be capable of identifying such properties based on new sensor data.

In some examples, the method 400 may include providing user instructions, guidance, support, tutorials, etc., associated with the operation of the robotic cosmetic application device (in general, and/or to apply the selected makeup look), e.g., via an integrated user interface, or by sending the user instructions, guidance, support, tutorials, etc. to a separate device to be presented via a user interface of the separate device.

Moreover, in some examples, the method 400 may further include analyzing the sensor data in real-time to identify blemishes of the skin of the user, and automatically adjusting the arms and/or the applicator tools, based on identified blemishes, i.e., beyond the initial parameters of the selected makeup look. For instance, the method 400 may include adjusting an amount of particular cosmetic product, e.g., to add more foundation or concealer, to an area of the user's face including a blemish, in order to cover the blemish with the cosmetic product. Furthermore, in some examples, the method 400 may include analyzing the sensor data in real-time to determine whether the blemish is sufficiently covered based on an initial application of the cosmetic product, and may include automatically adjusting the arms and/or applicator tools to add additional cosmetic product as needed until the blemish is sufficiently covered.

Additionally, in some examples, the method 400 may further include analyzing the sensor data in real-time to identify skin reactions of the skin of the user, and automatically generating alerts or notifications based on any identified skin reactions. For instance, the method 400 may include presenting such generated alerts via an integrated user interface, and/or sending such generated alerts to a separate device to be displayed via a user interface of the separate device.

In some examples, the robotic cosmetic application device may include integrated dispensers for various cosmetic products, and the method 400 may include controlling the dispensers to dispense the various cosmetic products as needed during the application of the makeup look to the face of the user. Furthermore, the robotic cosmetic application device may include temperature control components (e.g., heating elements, cooling elements, fans, etc.) for the dispensers for the various cosmetic products, and the method 400 may include controlling the temperature control components for each dispenser based on a particular range of temperatures associated with the cosmetic product with each dispenser. Additionally, the method 400 may include tracking the dispensing of the cosmetic products via the integrated dispensers, and determining, based on the tracking, when refills of one or more of the cosmetic products are required. For instance, the method 400 may include generating a notification indicating that a refill is required for one of the cosmetic products. For example, the method 400 may include providing the notification via an integrated user interface, or sending the notification to a separate device to be provided via a user interface of the separate device.

Furthermore, in some examples, the method 400 may include capturing data associated with packaging of various cosmetic products (i.e., cosmetic products to be added to integrated dispensers of the robotic cosmetic application device 100, and/or cosmetic products stored separately from the robotic cosmetic application device 100), and analyzing the data associated with he packaging of the various cosmetic products to identify respective cosmetic products based on their packaging. For instance, in some examples, this analysis may include capturing an image of a cosmetic product package and using object recognition techniques to identify a likely type of cosmetic product and/or likely properties associated with the cosmetic product based on the image. Moreover, in some examples, this analysis may include analyzing an image of the cosmetic product packaging using optical character recognition techniques to identify one or more letters, numbers, words, codes, etc., on the cosmetic product packaging, and accessing a database associated with cosmetic products to match any identified letters, numbers, words, codes, etc., on the cosmetic product packaging with particular cosmetic products and/or particular properties associated therewith. As another example, this analysis may include analyzing an image of the cosmetic product packaging to identify and/or decode a barcode, QR code, etc. For instance, the payload of the barcode, QR code, etc., may include an identification or indication of the cosmetic product and/or properties associated therewith. Moreover, in some examples, the method 400 may include identifying a cosmetic product and/or properties associated therewith based on input provided by a user (e.g., input provided via an integrated user interface of the robotic cosmetic application device, and/or via a user interface of a separate device that is sent to the robotic cosmetic application device). The method 400 may further include adjusting movements of the arms and/or applicator tools based on particular cosmetic products being applied using the applicator tools, and/or properties associated therewith.

Additionally, in some examples, the robotic cosmetic application device may include a cleaning component configured to clean and/or disinfect one or more components of the robotic cosmetic application device (such as, e.g., the applicator tools, the dispensers, the exterior of the robotic cosmetic application device, etc.), and the method 400 may include controlling the cleaning component to clean and/or disinfect the one or more components of the robotic cosmetic application device (e.g., at regular intervals, at the request of the user, etc.).

In some examples, the method 400 may further include receiving feedback associated with the makeup look from the user (e.g., via a user interface) subsequent to the application of the one or more cosmetic products to the face of the user, and storing the feedback associated with the makeup look. For instance, the method 400 may update one or more aspects of the makeup look in future applications based on feedback provided by the user.

Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" or "some embodiments" means that a particular element, feature, structure, or characteristic described in connection with the embodiment is included in at least one embodiment. The appearances of the phrase "in one embodiment" or "in some embodiments" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a robotic cosmetic application device, and/or systems, methods, and/or techniques associated therewith. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Aspects

1. An intelligent robotic cosmetic application device, comprising: one or more sensors configured to capture real-time data associated with a face of a user; one or more robotic arms equipped with one or more respective makeup applicator tools; a controller, comprising: one or more processors; and one or more memories storing non-transitory computer-readable instructions that, when executed by the one or more processors, cause the one or more processors to: receive, from a user interface associated with the intelligent robotic cosmetic application device, an indication of a makeup look selected by the user; analyze the real-time data associated with the face of the user in order to generate a three-dimensional map associated with the face of the user; identify one or more facial features of the face of the user on the three-dimensional map associated with the face of the user; and control the one or more robotic arms to automatically adjust the one or more respective makeup applicator tools with respect to the face of the user, to apply one or more cosmetic products to the facial features of the user in order to achieve the makeup look selected by the user.

2. The intelligent robotic cosmetic application device of aspect 1, wherein the one or more sensors include one or more of a camera or a depth sensor.

3. The intelligent robotic cosmetic application device of any one of aspects 1-2, wherein the one or more makeup applicator tools include one or more of: a brush applicator tool, a sponge applicator tool, a puff applicator tool, a pencil applicator tool, a felt tip applicator tool, a marker applicator tool, a crayon applicator tool, a lip stick applicator tool, a lip gloss applicator tool, a roller applicator tool, or a mascara wand applicator tool.

4. The intelligent robotic cosmetic application device of any one of aspects 1-3, further comprising a haptic feedback component, configured to provide guidance to the user as the intelligent robotic cosmetic application device applies the one or more cosmetic products to the facial features of the user.

5. The intelligent robotic cosmetic application device of any one of aspects 1-4, wherein the user interface is integrated into the intelligent robotic cosmetic application device.

6. The intelligent robotic cosmetic application device of any one of aspects 1-5, further comprising a communication interface configured to communicate with a mobile device, external to the intelligent robotic cosmetic application device.

7. The intelligent robotic cosmetic application device of aspect 6, wherein the communication interface is a wired communication interface.

8. The intelligent robotic cosmetic application device of aspect 6, wherein the communication interface is a wireless communication interface.

9. The intelligent robotic cosmetic application device of any one of aspects 6-8, wherein the user interface is integrated into the mobile device.

10. The intelligent robotic cosmetic application device of any one of aspects 6-9, wherein the non-transitory computer-readable instructions, when executed by the one or more processors, further cause the one or more processors to request images of the face of the user as captured by a camera of the mobile device, wherein the images of the face of the user are used to generate a three-dimensional map associated with the face of the user.

11. The intelligent robotic cosmetic application device of any one of aspects 6-10, wherein the non-transitory computer-readable instructions, when executed by the one or more processors, further cause the one or more processors to request that a light source of the mobile device modify one or more lighting parameters in order to provide light to the face of the user.

12. The intelligent robotic cosmetic application device of any one of aspects 1-11, further comprising an augmented reality (AR) component configured to generate and display an AR version of the three-dimensional map associated with the face of the user.

13. The intelligent robotic cosmetic application device of aspect 12, wherein the AR component is integrated into the user interface.

14. The intelligent robotic cosmetic application device of any one of aspects 12-13, wherein the non-transitory computer-readable instructions, when executed by the one or more processors, further cause the one or more processors to generate a three-dimensional preview of the makeup look selected by the user as applied to the three-dimensional map associated with the face of the user, and wherein the AR component is further configured to generate and display an AR version of the three-dimensional preview of the makeup look selected by the user as applied to the three-dimensional map associated with the face of the user.

15. The intelligent robotic cosmetic application device of aspect 14, wherein the three-dimensional preview of the makeup look selected by the user includes a three-dimensional preview of the application process of the makeup look selected by the user.

16. The intelligent robotic cosmetic application device of any one of aspects 1-16, further comprising one or more dispensers for the one or more cosmetic products, wherein the non-transitory computer-readable instructions, when executed by the one or more processors, further cause the one or more processors to control the dispensing of the one or more cosmetic products via the one or more dispensers.

17. The intelligent robotic cosmetic application device of aspect 16, further comprising one or more temperature control components configured to control temperatures associated with the one or more dispensers for the one or more cosmetic products within a particular range of temperatures.

18. The intelligent robotic cosmetic application device of any one of aspects 16-17, wherein the non-transitory computer-readable instructions, when executed by the one or more processors, further cause the one or more processors to: track the dispensing of the one or more cosmetic products via the one or more dispensers; determine, based on tracking the dispensing of the one or more cosmetic products via the one or more dispensers, that a refill of one or more of the cosmetic products is required; and provide a notification indicating that the refill of one or more of the cosmetic products is required, via the user interface.

19. The intelligent robotic cosmetic application device of any one of aspects 1-18, further comprising a cleaning component configured to one or more of: clean or disinfect one or more components of the intelligent robotic cosmetic application device.

20. The intelligent robotic cosmetic application device of any one of aspects 1-19, further comprising a light source configured to provide light to the face of the user.

21. The intelligent robotic cosmetic application device of aspect 20, wherein the non-transitory computer-readable instructions, when executed by the one or more processors, further cause the one or more processors to control the light source to provide particular lighting conditions while the one or more cosmetic products are applied to the facial features of the user.

22. The intelligent robotic cosmetic application device of any one of aspects 1-21, wherein automatically adjusting the one or more makeup applicator tools of the intelligent robotic cosmetic application device includes automatically adjusting one or more of an angle, a pressure, or a movement of the one or more makeup applicator tools of the intelligent robotic cosmetic application device.

23. The intelligent robotic cosmetic application device of any one of aspects 1-22, wherein the instructions, when executed by the one or more processors, further cause the one or more processors to identify one or more blemishes of the face of the user on the three-dimensional map associated with the face of the user, and wherein controlling the one or more robotic arms to adjust the one or more makeup applicator tools of the intelligent robotic cosmetic application device in real-time, to apply one or more cosmetic products to the facial features of the user, is further based on the identified one or more blemishes of the face of the user.

24. The intelligent robotic cosmetic application device of any one of aspects 1-23, wherein controlling the one or more robotic arms to adjust the one or more makeup applicator tools of the intelligent robotic cosmetic application device in real-time, to apply one or more cosmetic products to the facial features of the user, is further based on one or more of: a skin type associated with the user, a skin health condition associated with the user, a hydration level of the skin of the user, a skin tone associated with the user, current temperature conditions, current humidity conditions, current precipitation conditions, current lighting conditions, a current time of day, or one or more properties associated with the one or more cosmetic products.

25. The intelligent robotic cosmetic application device of any one of aspects 1-24, wherein controlling the one or more robotic arms to automatically adjust the one or more makeup applicator tools of the intelligent robotic cosmetic application device in real-time, to apply the one or more cosmetic products to the facial features of the user applying particular cosmetic products to particular areas of the facial features of the face of the user.

26. The intelligent robotic cosmetic application device of any one of aspects 1-25, wherein the non-transitory computer-readable instructions, when executed by the one or more processors, further cause the one or more processors to operate in a manual mode based on an input provided by the user via the user interface, wherein, when operating in the manual mode, the one or more processors cease to control the one or more robotic arms to automatically adjust the one or more makeup applicator tools of the intelligent robotic cosmetic application device.

27. The intelligent robotic cosmetic application device of any one of aspects 1-27, wherein the non-transitory computer-readable instructions, when executed by the one or more processors, further cause the one or more processors to: analyze the real-time data associated with the face of a user to identify a skin reaction associated with the application of the one or more cosmetic products; and provide an alert, via the user interface, based on the identified skin reaction.

28. The intelligent robotic cosmetic application device of aspect 27, wherein the non-transitory computer-readable instructions, when executed by the one or more processors, further cause the one or more processors to: cease operating the one or more makeup applicator tools of the intelligent robotic cosmetic application device, based on the identified skin reaction.

29. The intelligent robotic cosmetic application device of any one of aspects 1-28, wherein the non-transitory computer-readable instructions, when executed by the one or more processors, further cause the one or more processors to analyze one or more of: the real-time data associated with the face of the user captured by the one or more sensors, or previously-captured data associated with the face of the user captured by the one or more sensors, in order to determine one or more of a skin type or skin health condition associated with the user.

30. The intelligent robotic cosmetic application device of aspect 29, wherein analyzing one or more of: the real-time data associated with the face of the user captured by the one or more sensors, or previously-captured data associated with the face of the user captured by the one or more sensors, in order to determine one or more of the skin type or the skin health condition associated with the user, includes applying a trained machine learning model to one or more of the real-time data associated with the face of the user captured by the one or more sensors, or previously-captured data associated with the face of the user captured by the one or more sensors, to determine one or more of the skin type or the skin health condition associated with the user.

31. The intelligent robotic cosmetic application device of aspect 30, wherein the non-transitory computer-readable instructions, when executed by the one or more processors, further cause the one or more processors to: obtain training data including data associated with faces of individuals as captured by one or more sensors, and corresponding skin types and/or skin health conditions associated with the respective individuals; and train a machine learning model, using the training data, to identify one or more of a skin type or a skin health condition associated with a new individual based on data associated with the face of the new individual as captured by one or more sensors, resulting in the trained machine learning model.

32. The intelligent robotic cosmetic application device of any one of aspects 1-31, wherein identifying the one or more facial features of the face of the user on the three-dimensional map associated with the face of the user includes applying a trained machine learning model to the three-dimensional map associated with the face of the user to identify the one or more facial features of the face of the user.

33. The intelligent robotic cosmetic application device of aspect 32, wherein the non-transitory computer-readable instructions, when executed by the one or more processors, further cause the one or more processors to:

obtain training data including three-dimensional maps associated with faces of individuals and corresponding facial features of the faces of the respective individuals; and train a machine learning model, using the training data, to identify one or more facial features of a face of a new individual based on a three-dimensional map associated with the face of the new individual, resulting in the trained machine learning model.

34. The intelligent robotic cosmetic application device of any one of aspects 1-33, wherein the one or more sensors are further configured to capture data associated with packaging of the one or more cosmetic products, and wherein the non-transitory computer-readable instructions, when executed by the one or more processors, further cause the one or more processors to analyze the data associated with the packaging of the one or more cosmetic products to identify the one or more cosmetic products.

35. The intelligent robotic cosmetic application device of aspect 34, wherein identifying the one or more cosmetic products includes determining one or more properties associated with the one or more cosmetic products.

36. The intelligent robotic cosmetic application device of any one of aspects 1-35, wherein the one or more memories are further configured to store one or more makeup looks previously selected by the user.

37. The intelligent robotic cosmetic application device of any one of aspects 1-36, wherein receiving an indication of a makeup look selected by the user includes receiving an indication of a makeup look selected by the user from a plurality of makeup looks provided by a subscription service.

38. The intelligent robotic cosmetic application device of any one of aspects 1-37, wherein the non-transitory computer-readable instructions, when executed by the one or more processors, further cause the one or more processors to generate one or more suggested makeup looks for the user based on current trends associated with one or more makeup looks.

39. The intelligent robotic cosmetic application device of any one of aspects 1-38, wherein the non-transitory computer-readable instructions, when executed by the one or more processors, further cause the one or more processors to generate one or more suggested makeup looks for the user based on a mood and/or setting of the user.

40. The intelligent robotic cosmetic application device of aspect 39, wherein the non-transitory computer-readable instructions, when executed by the one or more processors, further cause the one or more processors to determine the mood of the user based on data associated with one or more of facial expressions, voice tone, or other behavioral cues, of the user, captured by the one or more sensors.

41. The intelligent robotic cosmetic application device of any one of aspects 1-40, wherein the non-transitory computer-readable instructions, when executed by the one or more processors, further cause the one or more processors to generate one or more suggested makeup looks for the user based on one or more makeup looks previously selected by the user.

42. The intelligent robotic cosmetic application device of any one of aspects 1-41, wherein generate one or more suggested makeup looks for the user based on one or more makeup looks previously selected by the user includes applying a trained machine learning model to the one or more makeup looks previously selected by the user to generate one or more suggested makeup looks for the user.

43. The intelligent robotic cosmetic application device of aspect 41, wherein the non-transitory computer-readable instructions, when executed by the one or more processors, further cause the one or more processors to: obtain training data including data associated with makeup looks previously selected by individuals, and corresponding subsequent makeup looks selected by respective individuals; and train a machine learning model, using the training data, to identify a suggested makeup look for a new individual based on data associated with makeup looks previously selected by the individual, resulting in the trained machine learning model.

44. The intelligent robotic cosmetic application device of aspect 42, wherein the non-transitory computer-readable instructions, when executed by the one or more processors, further cause the one or more processors to: receive feedback associated with the makeup look, subsequent to the application of the one or more cosmetics products to the facial features of the user, from the user, via the user interface, wherein feedback associated with a makeup look is included in data associated with the makeup look.

45. The intelligent robotic cosmetic application device of any one of aspects 1-44, wherein the non-transitory computer-readable instructions, when executed by the one or more processors, further cause the one or more processors to generate reminders associated with one or more of cleaning or maintenance of the intelligent robotic cosmetic application device, and to provide the reminders via the user interface.

46. The intelligent robotic cosmetic application device of any one of aspects 1-45, wherein the non-transitory computer-readable instructions, when executed by the one or more processors, further cause the one or more processors to: analyze biometric data associated with the user captured by the one or more sensors in order to determine whether the user is an authorized user; and restrict operation of the intelligent robotic cosmetic application device to authorized users only.

47. The intelligent robotic cosmetic application device of any one of aspects 1-46, wherein the non-transitory computer-readable instructions, when executed by the one or more processors, further cause the one or more processors to provide one or more user instructions, guidance, support, or tutorials associated with the operation of the intelligent robotic cosmetic application device, via the user interface.

48. The intelligent robotic cosmetic application device of any one of aspects 1-47, wherein the non-transitory computer-readable instructions, when executed by the one or more processors, further cause the one or more processors to: generate real-time feedback to the user as the one or more cosmetic products are applied to the facial features of the user, the real-time feedback including one or more improvements or corrections associated with the application of the one or more cosmetics products to the facial features of the user. The intelligent robotic cosmetic application device of claim 1, wherein the non-transitory computer-readable instructions, when executed by the one or more processors, further cause the one or more processors to operate in one or more modes associated with respective users or types of users.

49. The intelligent robotic cosmetic application of any one of aspects 1-48, wherein the intelligent robotic cosmetic application device is integrated with a prosthetic limb of the user.

50. The intelligent robotic cosmetic application of any one of aspects 1-49, wherein the mobile device is a heads up display (HUD) device.

51. A computer-implemented method for controlling an intelligent robotic cosmetic application device via one or more processors, comprising: receiving, from a user interface associated with the intelligent robotic cosmetic application device, an indication of a makeup look selected by the user; analyzing real-time data associated with the face of the user captured by one or more sensors in order to generate a three-dimensional map associated with the face of the user; identifying one or more facial features of the face of the user on the three-dimensional map associated with the face of the user; and controlling one or more robotic arms of the intelligent robotic cosmetic application device, equipped with one or more respective makeup applicator tools, to automatically adjust the one or more respective makeup applicator tools with respect to the face of the user, to apply one or more cosmetic products to the facial features of the user in order to achieve the makeup look selected by the user.

52. A non-transitory computer-readable medium storing instructions for controlling an intelligent robotic cosmetic application device that, when executed by one or more processors, cause the one or more processors to perform a method comprising: receiving, from a user interface associated with the intelligent robotic cosmetic application device, an indication of a makeup look selected by the user; analyzing the real-time data associated with the face of the user captured by one or more sensors in order to generate a three-dimensional map associated with the face of the user; identifying one or more facial features of the face of the user on the three-dimensional map associated with the face of the user; and controlling one or more robotic arms of the intelligent robotic cosmetic application device, equipped with one or more respective makeup applicator tools, to automatically adjust the one or more respective makeup applicator tools with respect to the face of the user, to apply one or more cosmetic products to the facial features of the user in order to achieve the makeup look selected by the user.

What is claimed is:

1. An intelligent robotic cosmetic application device, comprising:
one or more sensors configured to capture real-time data associated with a face of a user;
one or more robotic arms equipped with one or more respective makeup applicator tools;
a controller, comprising:
one or more processors; and
one or more memories storing non-transitory computer-readable instructions that, when executed by the one or more processors, cause the one or more processors to:
receive, from a user interface associated with the intelligent robotic cosmetic application device, an indication of a makeup look selected by the user;
analyze the real-time data associated with the face of the user in order to generate a three-dimensional map associated with the face of the user;

identify one or more facial features of the face of the user on the three-dimensional map associated with the face of the user; and
control the one or more robotic arms to automatically:
dip the one or more respective makeup applicator tools into one or more dispensers or containers containing cosmetic products; and
adjust the one or more respective makeup applicator tools with respect to the face of the user, to apply one or more cosmetic products to at least one of the one or more facial features of the user by touching the one or more respective makeup applicator tools to the at least one of the one or more facial features of the user in order to achieve the makeup look selected by the user.

2. The intelligent robotic cosmetic application device of claim 1, wherein the one or more sensors include one or more of a camera or a depth sensor.

3. The intelligent robotic cosmetic application device of claim 1, wherein the one or more makeup applicator tools include one or more of: a brush applicator tool, a sponge applicator tool, a puff applicator tool, a pencil applicator tool, a felt tip applicator tool, a marker applicator tool, a crayon applicator tool, a lip stick applicator tool, a lip gloss applicator tool, a roller applicator tool, or a mascara wand applicator tool.

4. The intelligent robotic cosmetic application device of claim 1, wherein the user interface is integrated into the intelligent robotic cosmetic application device.

5. The intelligent robotic cosmetic application device of claim 1, further comprising a communication interface configured to communicate with a mobile device, external to the intelligent robotic cosmetic application device.

6. The intelligent robotic cosmetic application device of claim 5, wherein the communication interface is a wired communication interface.

7. The intelligent robotic cosmetic application device of claim 5, wherein the communication interface is a wireless communication interface.

8. The intelligent robotic cosmetic application device of claim 5, wherein the user interface is integrated into the mobile device.

9. The intelligent robotic cosmetic application device of claim 5, wherein the non-transitory computer-readable instructions, when executed by the one or more processors, further cause the one or more processors to request images of the face of the user as captured by a camera of the mobile device, wherein the images of the face of the user are used to generate the three-dimensional map associated with the face of the user.

10. The intelligent robotic cosmetic application device of claim 5, wherein the non-transitory computer-readable instructions, when executed by the one or more processors, further cause the one or more processors to request that a light source of the mobile device modify one or more lighting parameters in order to provide light to the face of the user.

11. The intelligent robotic cosmetic application device of claim 1, further comprising an augmented reality (AR) component configured to generate and display an AR version of the three-dimensional map associated with the face of the user.

12. The intelligent robotic cosmetic application device of claim 11, wherein the AR component is integrated into the user interface.

13. The intelligent robotic cosmetic application device of claim 11, wherein the non-transitory computer-readable instructions, when executed by the one or more processors, further cause the one or more processors to generate a three-dimensional preview of the makeup look selected by the user as applied to the three-dimensional map associated with the face of the user, and wherein the AR component is further configured to generate and display an AR version of the three-dimensional preview of the makeup look selected by the user as applied to the three-dimensional map associated with the face of the user.

14. The intelligent robotic cosmetic application device of claim 13, wherein the three-dimensional preview of the makeup look selected by the user includes a three-dimensional preview of an application process of the makeup look selected by the user.

15. The intelligent robotic cosmetic application device of claim 1, further comprising one or more dispensers for the one or more cosmetic products, wherein the non-transitory computer-readable instructions, when executed by the one or more processors, further cause the one or more processors to control dispensing of the one or more cosmetic products via the one or more dispensers.

16. The intelligent robotic cosmetic application device of claim 15, further comprising one or more temperature control components configured to control temperatures associated with the one or more dispensers for the one or more cosmetic products within a particular range of temperatures.

17. The intelligent robotic cosmetic application device of claim 15, wherein the non-transitory computer-readable instructions, when executed by the one or more processors, further cause the one or more processors to:

track the dispensing of the one or more cosmetic products via the one or more dispensers;

determine, based on tracking the dispensing of the one or more cosmetic products via the one or more dispensers, that a refill of at least one of the one or more cosmetic products is required; and provide a notification indicating that the refill of at least one of the one or more cosmetic products is required, via the user interface.

18. A computer-implemented method for controlling an intelligent robotic cosmetic application device via one or more processors, comprising:

receiving, from a user interface associated with the intelligent robotic cosmetic application device, an indication of a makeup look selected by a user;

analyzing real-time data associated with a face of the user captured by one or more sensors in order to generate a three-dimensional map associated with the face of the user;

identifying one or more facial features of the face of the user on the three-dimensional map associated with the face of the user; and controlling one or more robotic arms of the intelligent robotic cosmetic application device, equipped with one or more respective makeup applicator tools, to automatically:

dip the one or more respective makeup applicator tools into one or more dispensers or containers containing cosmetic products; and adjust the one or more respective makeup applicator tools with respect to the face of the user, to apply one or more cosmetic products to at least one of the one or more facial features of the user by touching the one or more respective makeup applicator tools to the at least one of the one or more facial features of the user in order to achieve the makeup look selected by the user.

19. A non-transitory computer-readable medium storing instructions for controlling an intelligent robotic cosmetic application device that, when executed by one or more processors, cause the one or more processors to perform a method comprising:

receiving, from a user interface associated with the intelligent robotic cosmetic application device, an indication of a makeup look selected by a user;

analyzing real-time data associated with a face of the user captured by one or more sensors in order to generate a three-dimensional map associated with the face of the user;

identifying one or more facial features of the face of the user on the three-dimensional map associated with the face of the user; and controlling one or more robotic arms of the intelligent robotic cosmetic application device, equipped with one or more respective makeup applicator tools, to automatically:

dip the one or more respective makeup applicator tools into one or more dispensers or containers containing cosmetic products; and adjust the one or more respective makeup applicator tools with respect to the face of the user, to apply one or more cosmetic products to at least one of the one or more facial features of the user by touching the one or more respective makeup applicator tools to the at least one of the one or more facial features of the user in order to achieve the makeup look selected by the user.

* * * * *